(12) United States Patent
Day et al.

(10) Patent No.: US 8,681,320 B2
(45) Date of Patent: Mar. 25, 2014

(54) GIMBAL INSTRUMENT HAVING A PREALIGNED AND REPLACEABLE OPTICS BENCH

(75) Inventors: Jonathan Robert Day, Wilmington, DE (US); Lawrence B. Brown, Cochranville, PA (US); James K. West, Landenberg, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 104 days.

(21) Appl. No.: 13/445,968

(22) Filed: Apr. 13, 2012

(65) Prior Publication Data
US 2012/0262698 A1 Oct. 18, 2012

Related U.S. Application Data

(60) Provisional application No. 61/592,049, filed on Jan. 30, 2012, provisional application No. 61/475,703, filed on Apr. 15, 2011.

(51) Int. Cl.
*G01C 3/08* (2006.01)

(52) U.S. Cl.
USPC .................. 356/4.01; 356/3.01; 356/5.01

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 2,682,804 | A | 7/1954 | Clifford et al. |
| 2,784,641 | A | 3/1957 | Keuffel et al. |
| 3,339,457 | A | 9/1967 | Pun |
| 3,365,717 | A | 1/1968 | Holscher |

(Continued)

FOREIGN PATENT DOCUMENTS

| | | |
|---|---|---|
| CN | 1531659 A | 9/2004 |
| CN | 101031817 A | 9/2007 |

(Continued)

OTHER PUBLICATIONS

International Search Report of the International Searching Authority for Application No. PCT/US20121034611; Date of Mailing Dec. 13, 2012.

(Continued)

*Primary Examiner* — Luke Ratcliffe
(74) *Attorney, Agent, or Firm* — Cantor Colburn LLP

(57) ABSTRACT

A method includes providing: an optics assembly including a housing, a beam splitter, and a position detector; and an alignment fixture; placing the assembly on the fixture which makes contact with the assembly on the first region; projecting the third beam of light onto a first surface; rotating the assembly about the sixth axis on the fixture; sensing a change in a position of the third beam of light in response to rotation of the assembly about the sixth axis; adjusting the first path to align the third beam of light to the sixth axis; attaching the assembly to a dimensional measurement device; directing the third beam of light to a retroreflector target; reflecting a portion of the third beam from the target as a fourth beam of light; and sending a third portion of the fourth beam from the beam splitter to the position detector.

24 Claims, 31 Drawing Sheets

(56) References Cited

U.S. PATENT DOCUMENTS

| | | |
|---|---|---|
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,297,030 A | 10/1981 | Chaborski |
| 4,403,857 A | 9/1983 | Holscher |
| 4,453,825 A | 6/1984 | Buck et al. |
| 4,498,764 A | 2/1985 | Bolkow et al. |
| 4,531,833 A | 7/1985 | Ohtomo |
| 4,632,547 A | 12/1986 | Kaplan et al. |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,790,651 A | 12/1988 | Brown et al. |
| 5,002,388 A | 3/1991 | Ohishi et al. |
| 5,051,934 A | 9/1991 | Wiklund |
| 5,082,364 A | 1/1992 | Russell |
| 5,162,862 A | 11/1992 | Bartram et al. |
| 5,319,434 A | 6/1994 | Croteau et al. |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,455,670 A | 10/1995 | Payne et al. |
| 5,534,992 A | 7/1996 | Takeshima et al. |
| 5,737,068 A | 4/1998 | Kaneko et al. |
| 5,742,379 A | 4/1998 | Reifer |
| 5,754,284 A | 5/1998 | Leblanc et al. |
| 5,764,360 A | 6/1998 | Meier |
| 5,771,623 A | 6/1998 | Pernstich et al. |
| 5,880,822 A | 3/1999 | Kubo |
| 5,886,777 A | 3/1999 | Hirunuma |
| 5,892,575 A | 4/1999 | Marino |
| 5,991,011 A | 11/1999 | Damm |
| D427,087 S | 6/2000 | Kaneko et al. |
| 6,100,540 A | 8/2000 | Ducharme et al. |
| 6,324,024 B1 | 11/2001 | Shirai et al. |
| 6,330,379 B1 | 12/2001 | Hendriksen |
| 6,351,483 B1 | 2/2002 | Chen |
| 6,369,880 B1 | 4/2002 | Steinlechner |
| 6,463,393 B1 | 10/2002 | Giger |
| 6,490,027 B1 | 12/2002 | Rajchel et al. |
| 6,563,569 B2 | 5/2003 | Osawa et al. |
| 6,583,862 B1 | 6/2003 | Perger |
| 6,633,367 B2 | 10/2003 | Gogolla |
| 6,727,985 B2 | 4/2004 | Giger |
| 6,765,653 B2 | 7/2004 | Shirai et al. |
| 6,847,436 B2 | 1/2005 | Bridges |
| 6,859,744 B2 | 2/2005 | Giger |
| 6,864,966 B2 | 3/2005 | Giger |
| 7,023,531 B2 | 4/2006 | Gogolla et al. |
| 7,095,490 B2 | 8/2006 | Ohtomo et al. |
| 7,177,014 B2 | 2/2007 | Mori et al. |
| 7,196,776 B2 | 3/2007 | Ohtomo et al. |
| 7,224,444 B2 | 5/2007 | Stierle et al. |
| 7,248,374 B2 | 7/2007 | Bridges |
| 7,256,899 B1 | 8/2007 | Faul et al. |
| 7,262,863 B2 | 8/2007 | Schmidt et al. |
| 7,327,446 B2 | 2/2008 | Cramer et al. |
| 7,336,346 B2 | 2/2008 | Aoki et al. |
| 7,339,655 B2 | 3/2008 | Nakamura et al. |
| 7,352,446 B2 | 4/2008 | Bridges et al. |
| 7,372,558 B2 | 5/2008 | Kaufman et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,586,586 B2 | 9/2009 | Constantikes |
| D605,959 S | 12/2009 | Apotheloz |
| 7,701,559 B2 | 4/2010 | Bridges et al. |
| 7,738,083 B2 | 6/2010 | Luo et al. |
| 7,751,654 B2 | 7/2010 | Lipson et al. |
| 7,800,758 B1 | 9/2010 | Bridges et al. |
| 7,804,602 B2 | 9/2010 | Raab |
| D629,314 S | 12/2010 | Ogasawara |
| 7,929,150 B1 | 4/2011 | Schweiger |
| 7,990,523 B2 | 8/2011 | Schlierbach et al. |
| 8,087,315 B2 | 1/2012 | Goossen et al. |
| 2003/0133092 A1 | 7/2003 | Rogers |
| 2004/0075823 A1 | 4/2004 | Lewis et al. |
| 2005/0147477 A1 | 7/2005 | Clark |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0145703 A1 | 7/2006 | Steinbichler et al. |
| 2006/0222237 A1 | 10/2006 | Du et al. |
| 2007/0016386 A1 | 1/2007 | Husted |
| 2007/0024842 A1 | 2/2007 | Nishizawa et al. |
| 2007/0121095 A1 | 5/2007 | Lewis |
| 2007/0130785 A1 | 6/2007 | Bublitz et al. |
| 2007/0247615 A1 | 10/2007 | Bridges |
| 2008/0239281 A1 | 10/2008 | Bridges |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0046271 A1 | 2/2009 | Constantikes |
| 2009/0066932 A1* | 3/2009 | Bridges et al. ............... 356/5.13 |
| 2010/0058252 A1 | 3/2010 | Ko |
| 2010/0128259 A1 | 5/2010 | Bridges et al. |
| 2010/0176270 A1 | 7/2010 | Lau et al. |
| 2010/0207938 A1 | 8/2010 | Yau et al. |
| 2010/0245851 A1 | 9/2010 | Teodorescu |
| 2010/0250175 A1 | 9/2010 | Briggs et al. |
| 2010/0277747 A1 | 11/2010 | Rueb et al. |
| 2011/0032509 A1 | 2/2011 | Bridges |
| 2011/0069322 A1 | 3/2011 | Hoffer, Jr. |
| 2011/0173827 A1 | 7/2011 | Bailey et al. |
| 2012/0262728 A1 | 10/2012 | Bridges et al. |

FOREIGN PATENT DOCUMENTS

| | | |
|---|---|---|
| DE | 3827458 A1 | 2/1990 |
| DE | 202006020299 U1 | 5/2008 |
| EP | 0166106 | 1/1986 |
| EP | 1067363 A2 | 1/2001 |
| EP | 1607767 A1 | 12/2005 |
| EP | 2177868 A2 | 10/2009 |
| EP | 2259010 A1 | 12/2010 |
| EP | 2259013 A1 | 12/2010 |
| JP | 57147800 | 9/1982 |
| JP | 5804881 | 3/1983 |
| JP | 2184788 | 7/1990 |
| JP | 5302976 | 11/1993 |
| JP | 6097288 | 4/1994 |
| JP | 11337642 | 12/1999 |
| JP | 2001272468 | 10/2001 |
| JP | 2002098762 | 4/2002 |
| JP | 2004527751 | 9/2004 |
| JP | 2008514967 | 5/2008 |
| WO | 0177613 A1 | 10/2001 |
| WO | 02084327 | 10/2002 |
| WO | 03062744 A1 | 7/2003 |
| WO | 2008052348 A1 | 5/2008 |

(56) References Cited

FOREIGN PATENT DOCUMENTS

| WO | 2008119073 A2 | 10/2008 |
|---|---|---|
| WO | 2010141120 A2 | 12/2010 |
| WO | 2010148525 A1 | 12/2010 |

OTHER PUBLICATIONS

Written Opinion of the International Searching Authority for Application No. PCT/US2012/034611; Date of Mailing Dec. 13, 2012.
Japanese Patent Application No. 2010-176909 filed Aug. 6, 2010; issued on Oct. 23, 2012.
Office Action for Japanese Patent Application No. 2010-176909 filed Aug. 6, 2010; issued on Mar. 19, 2013.
International Search Report of the International Searching Authority for Application No. PCT/2012/030225; Date of Mailing Sep. 28, 2012.
International Search Report of the International Searching Authority for Application No. PCT/US2012/032971; Date of Mailing Sep. 3, 2012.
International Search Report of the International Searching Authority for Application No. PCT/US2012/0033435; Date of Mailing Sep. 17, 2012.
International Search Report of the International Seracrhing Aurhority for Application No. PCT/YS2012/033720; Date of Mailing Sep.26, 2012.
Written Opinion of the International Searching Authority for Application No. PCT/US2012/030225; Date of Mailing Sep. 28, 2012.
Written Opinion of the International Searching Authority for Application No. PCT/US2012/032971; Date of Mailing Sep. 3, 2012.
Written Opinion of the International Searching Authority for Application No. PCT/US2012/033435; Date of Mailing Sep. 17, 2012.
Written Opinion of the International Searching Authority for Application No. PCT/US2012/033720; Date of Mailing Sep. 26, 2012.
Chen, Junewen, "Novel Laser Range Finding Algorithms", Proceedings of SPIE, vol. 6100, Jan. 1, 2006, pp. 61001Q-610010-8, XP55031002, ISSN: 0277-786X, DOI: 10.1117/12.645131, the whole document.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for PCT/US2012/032715; Date of Mailing Jul. 5, 2012.
International Search Report of the International Searching Authority for Application No. PCT/US2012/033477; Date of Mailing Jul. 20, 2012.
Leica Laser Tracker System, Leica Geosystems AG, Jan. 1, 1999, XP002678836, Retrieved from the Internet: URL:http://www.a-solution.com.au/pp./downloads/LTD500_Brochure_EN.pdf [retrieved on 2012] the whole document.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2002, pp. S356-S363, XP020080997, ISSN: 1464-4258, DOI: 10.1088/1464-4258/4/6/380, the whole document.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.
Written Opinion of the International Searching Authority for Application No. PCT/US2012/032715; Date of Mailing Jul. 5, 2012.
Written Opinion of the International Searching Authority for Application No. PCT/US2012/033477; Date of Mailing Jul. 20, 2012.

Optical Circulator (3-Ports & 4-Ports); [on-line technical data sheet]; Alliance Fiber Optic Products, Inc. REV.D Jan. 15, 2004; Retrieved from www.afop.com.
Super-Nyquist Operation of the AD9912 Yields a High RF Output Signal; Analog Devices, Inc., AN-939 Application Note; www.analog.com; Copyright 2007.
Nanona High Speed & Low Loss Optical Switch; [on-line technical data sheet]; [Retrieved Oct. 14, 2010]; Retrieved from http://www.bostonati.com/products/PI-FOS.pdf.
Making the Big Step from Electronics to Photonics by Modulating a Beam of Light with Electricity; May 18, 2005; [on-line]; [Retrieved May 7, 2009]; Cornell University News Service; Retreived from http://www.news.cornell.edu/stories/May05/LipsonElectroOptical.ws.html.
EOSpace—High-Speed Switches; [on-line technical brochure]; [Retrieved May 18, 2009]; Retrieved from http://www.cospace.com/Switches.htm.
FARO Laser Tracker ION; 2 pages; revised Apr. 23, 2010; FARO Technologies, Inc., www.lasertracker.faro.com.
Great Britain Search Report for Application No. GB1013200.9 dated Nov. 22, 2010.
AO Modulator—M040-8J-FxS; [online—technical data sheet]; Gooch & Housego; Nov. 2006; Retrieved from http://www.goochandhousego.com/.
2×2 High Speed Lithium Niobate Interferometric Switch; [on-line]; JDS Uniphase Corporation; 2007; Retrieved from www.jdsu.com.
Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudernodulators_en.pdf?Open.
Kester, Walt, Practical Analog Design Techniques, Analog Devices, Section 5, Undersampling Applications, Copyright 1995, pp. 5-1 to 5-34.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirectional-fiber-systems.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Lightvision—High Speed Variable Optical Attenuators (VOA); [online]; A publication of Lightwaves 2020, Feb. 1, 2008; Retrieved from http://www.lightwaves2020.com/home/.
LaserTRACER-measuring sub-micron in space; http://www.etalon-ag.com/index.php/en/products/lasertracer; 4 pages; Jun. 28, 2011; ETALON AG.
Computer Giants Embrace On-Chip Optics; Mar. 27, 2008; [on-line]; Optics.org; [Retrieved on Apr. 2, 2008]; Retrieved from http://optics.org/cws/article/research/33521.
MEMS Variable Optical Attenuators Single/Multi-Channel; [on-line]; Jan. 17, 2005; Retrieved from www.ozoptics.com.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retrieved10-14/2010]; Retrieved from http://www.sercalo.com/document/PDFs/DataSheets/RS%20datasheet.pdf.
Tracker3; Ultra-Portable Laser Tracking System; 4 pages; 2010 Automated Precision Inc.; www.apisensor.com.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.

(56) References Cited

OTHER PUBLICATIONS

International Search Report of the International Searching Authority for Application No. PCT/US2012/032990; Date of Mailing Dec. 4, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.
Written Opinion of the International Searching Authority for Application No. PCT/US2012/032990; Date of Mailing Dec. 4, 2012.
Chinese Office Action issued Sep. 22, 2013 for Patent Application No. 201010251189.3.
Chinese Search Report for Chinese Patent Application No. 2010102511893; Dated Sep. 10, 2013.
International Preliminary Report on Patentability for International International Serial Number PCT/US2012/030225 International filing Mar. 23, 2012. Date of Issuance Oct. 15, 2013.
International Preliminary Report on Patentability for International International Serial Number PCT/US2012/030835. International filing Mar. 28, 2012. Date of Issuance Oct. 15, 2013.
International Preliminary Report on Patentability for International International Serial Number PCT/US2012/032715. International filing Apr. 9, 2012. Date of Issuance Oct. 15, 2013.
International Preliminary Report on Patentability for International Application Serial Number PCT/US2012/032970. International filing Apr. 11, 2012. Date of Issuance Oct. 15, 2013.
International Preliminary Report on Patentability for International Application Serial Number PCT/US2012/032971. International filing Apr. 11, 2012. Date of Issuance Oct. 15, 2013.
International Preliminary Report on Patentability for International Application Serial Number PCT/US2012/032972. International filing Apr. 11, 2012. Date of Issuance Oct. 15, 2013.
International Preliminary Report on Patentability for International Application Serial Number PCT/US2012/032990. International filing Apr. 11, 2012. Date of Issuance Oct. 15, 2013.
International Preliminary Report on Patentability for International Application Serial Number PCT/US2012/033435. International filing Apr. 13, 2012. Date of Issuance Oct. 15, 2013.
International Preliminary Report on Patentability for International Application Serial Number PCT/US2012/033477. International filing date Apr. 13, 2012. Date of Issuance Oct. 15, 2013.
International Preliminary Report on Patentability for International Application Serial Number PCT/US2012/033720. International filing date Apr. 16, 2012. Date of Issuance Oct. 15, 2013.
International Preliminary Report on Patentability for International Application Serial Number PCT/US2012/031368. International filing date Mar. 30, 2012. Date of Issuance Oct. 15, 2013.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8, 2006.

* cited by examiner

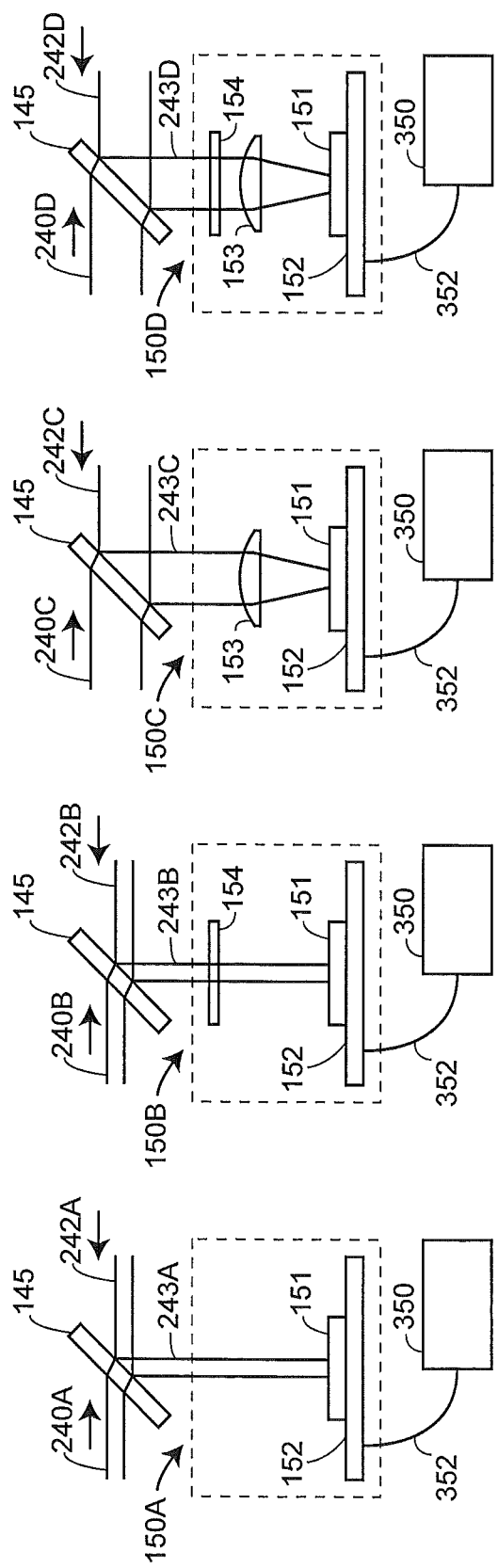

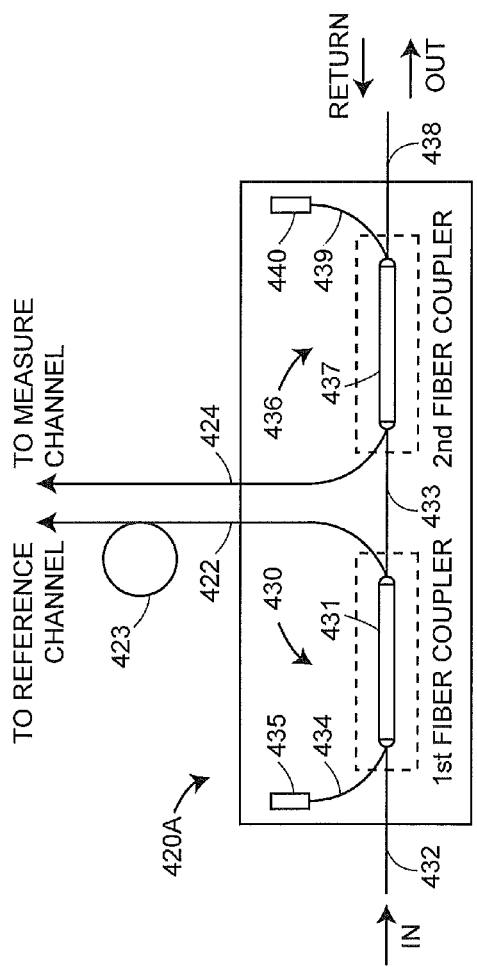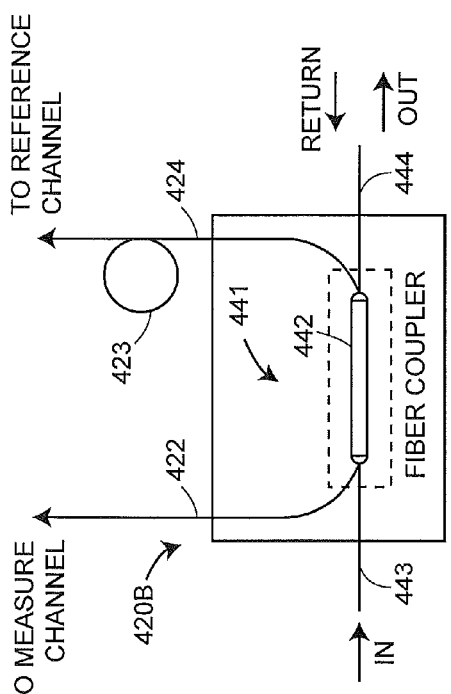
PRIOR ART
FIGURE 8A
PRIOR ART
FIGURE 8B

TOP VIEW

SECTION A-A

SECTION B-B

TOP VIEW

SECTION A-A

GIMBAL INSTRUMENT HAVING A PREALIGNED AND REPLACEABLE OPTICS BENCH

CROSS REFERENCE TO RELATED APPLICATIONS

The present application claims the benefit of U.S. Provisional Patent Application No. 61/592,049 filed Jan. 30, 2012, and U.S. Provisional Patent Application No. 61/475,703 filed Apr. 15, 2011, the entire contents of both of which are hereby incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352, 446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest. The gimbal mechanism used for a laser tracker may be used for a variety of other applications. As a simple example, the laser tracker may be used in a gimbal steering device having a visible pointer beam but no distance meter to steer a light beam to series of retroreflector targets and measure the angles of each of the targets.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., the contents of which are herein incorporated by reference, and U.S. Published Patent Application No. 2010/0128259 to Bridges et al., the contents of which are herein incorporated by reference.

Previously, optical components have been installed directly into a laser tracker frame. Realignments and repairs could be relatively difficult and costly. There is a need for a laser tracker having an optics bench configured to be prealigned and replaceable, thereby simplifying manufacture and repair.

SUMMARY

According to an embodiment of the present invention, a dimensional measurement device sends a first beam of light to a remote retroreflector target, the retroreflector target having a position in space, the retroreflector target returning a portion of the first beam as a second beam. The measurement device includes: a first motor and a second motor that together direct the first beam of light to a first direction, the first direction determined by a first angle of rotation about a first axis and a second angle of rotation about a second axis, the second axis substantially perpendicular to the first axis, the first axis and the second axis intersecting substantially at a gimbal point, the first angle of rotation produced by the first motor and the second angle of rotation produced by the second motor. The device also includes: an optics assembly including a housing, a light element, a lens, a first beam splitter, and a position detector, wherein the light element, the lens, the first beam splitter, and the position detector are fixedly attached to the housing, the housing having a substantially cylindrical shape over at least a first region of an outer surface of the housing, the cylindrical shape having a third axis passing through a center line of the cylindrical shape, distances from the third axis to points on the first region being a substantially constant value, the light element being either a source of light or an optical fiber component attached to the source of light, the light element configured to emit a first light, the first beam being a portion of the first light emitted from the optics assembly, the optics assembly configured to send the first beam of light along a fourth axis, the third axis and the fourth axis substantially coincident and substantially in line with the gimbal point and substantially in a plane containing the first axis and perpendicular to the second axis, the first beam splitter configured to send a second portion of the second beam of light to the position detector, the position detector configured to produce a first signal in response to a position of the second portion on the position detector; and a control system that sends a second signal to the first motor and a third signal to the second motor, the second signal and the third signal based at least in part on the first signal, the control system configured to adjust the first direction to the position in space of the retroreflector target.

According to another embodiment of the present invention, a method of pre-aligning an optics assembly, installing the optics assembly in a dimensional measurement device, and using the dimensional measurement device to measure a remote retroreflector target. The method includes the steps of: providing a first motor and a second motor that together align a fifth axis to a first direction, the first direction determined by a first angle of rotation about a first axis and a second angle of rotation about a second axis, the second axis substantially perpendicular to the first axis, the first axis, the second axis, and the fifth axis intersecting substantially at a gimbal point, the first angle of rotation produced by the first motor and the second angle of rotation produced by the second motor. The method also includes: providing an optics assembly including a housing, a light element, a lens, a first beam splitter, and a position detector, wherein the light element, the lens, the first beam splitter, and the position detector are fixedly attached to the housing, the housing having a substantially cylindrical shape over at least a first region of an outer surface of the housing, the cylindrical shape having a sixth axis passing through a center line of the cylindrical shape, distances from the sixth axis to points on the first region having a substantially constant value, the light element being either a source of light or an optical fiber component attached to the source of light, the light element configured to emit a first light, a third beam of light being a portion of the first light, the third beam of light having a first path in relation to the optics assembly, the optics assembly configured to enable adjustment of the first path. The method further includes: providing an alignment fixture, the alignment fixture configured to support the optics assembly on the first region and to constrain rotation of the optics assembly about the sixth axis; placing the optics assembly on the alignment fixture in such a manner that the alignment fixture makes contact with the optics assembly at points of contact on the first region; projecting the third beam of light onto a first surface, the first surface at a first distance from the optics assembly; rotating the optics assembly about the sixth axis on the alignment fixture; sensing a change in a position of the third beam of light on the first surface in response to the rotation of the optics assembly about the sixth axis; adjusting the first path to align the third beam of light to the sixth axis, the adjustment based at least in part on the observed change in the position of the third beam of light on the first surface; attaching the optics assembly to the dimensional measurement device, wherein the attaching aligns the third beam of light with the fifth axis; directing the third beam of light to a remote retroreflector target; reflecting a portion of the third beam of light from the retroreflector target as a fourth beam of light; and sending a third portion of the fourth beam of light from the beam splitter to the position detector.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIG. 6A-D are schematic figures that show four types of prior art position detector assemblies;

FIGS. 8A and 8B are schematic figures showing fiber-optic elements within a prior art fiber-optic network;

DETAILED DESCRIPTION

Figure 1:
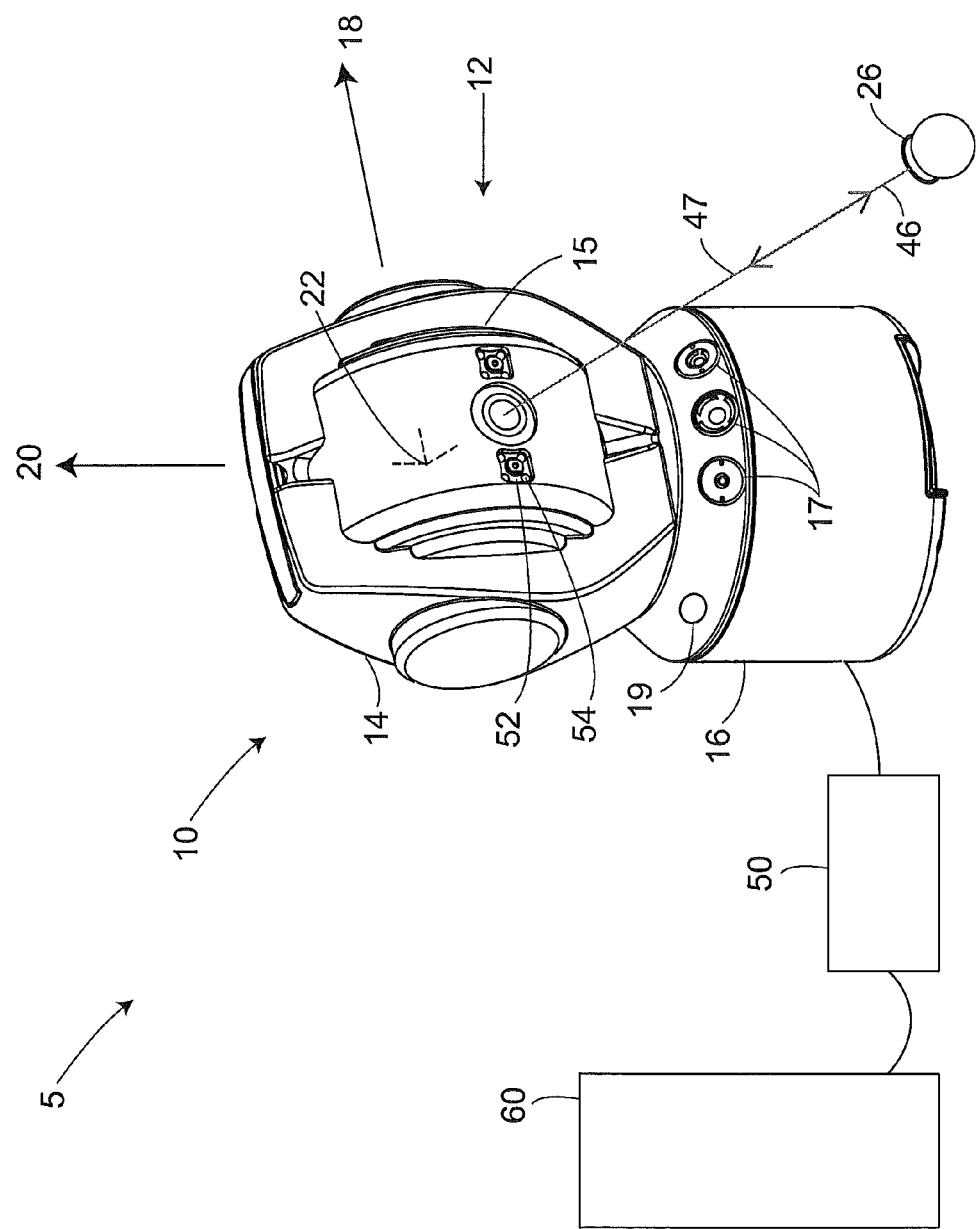
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, 7/8, and 1/2 inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
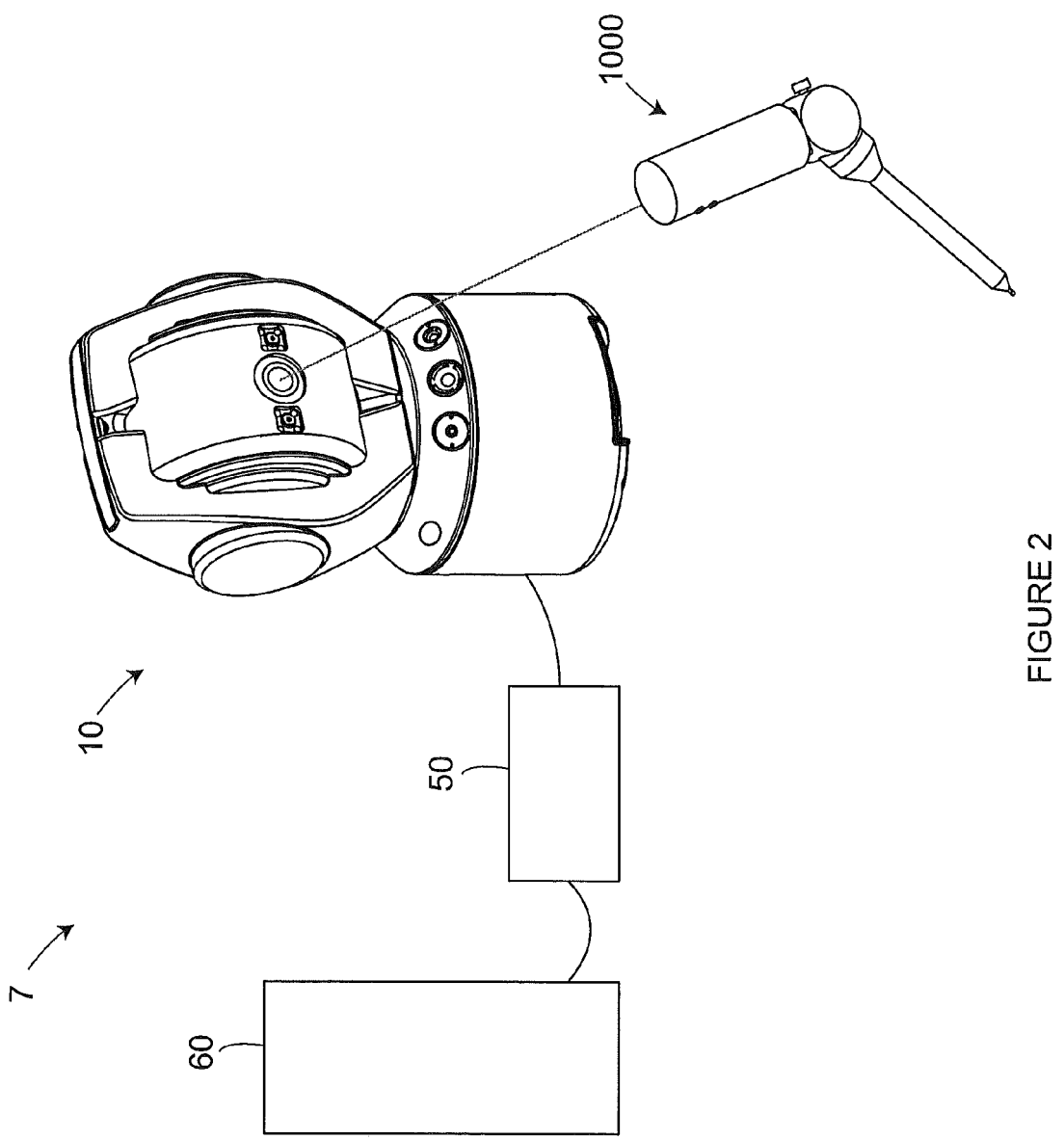
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
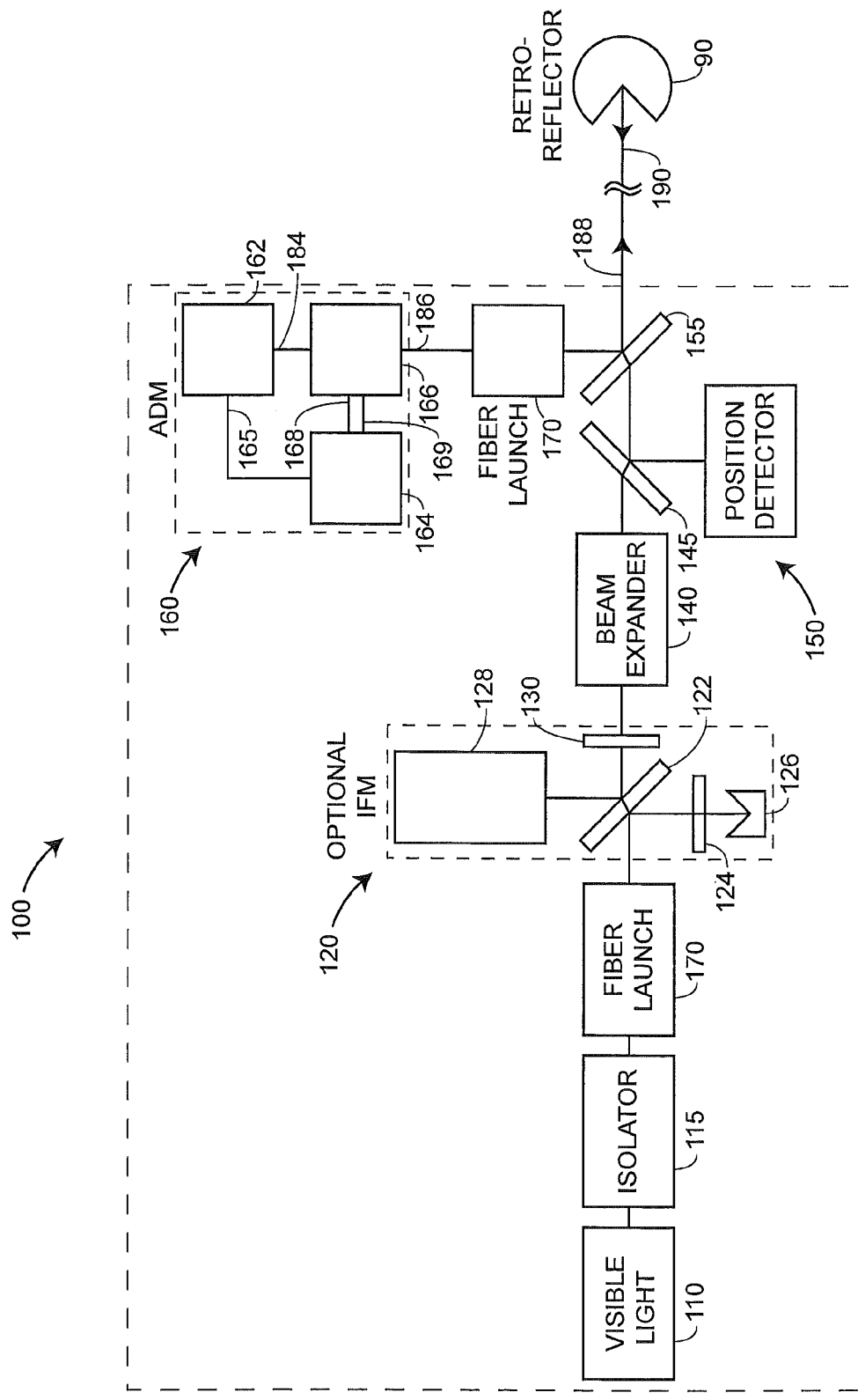
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
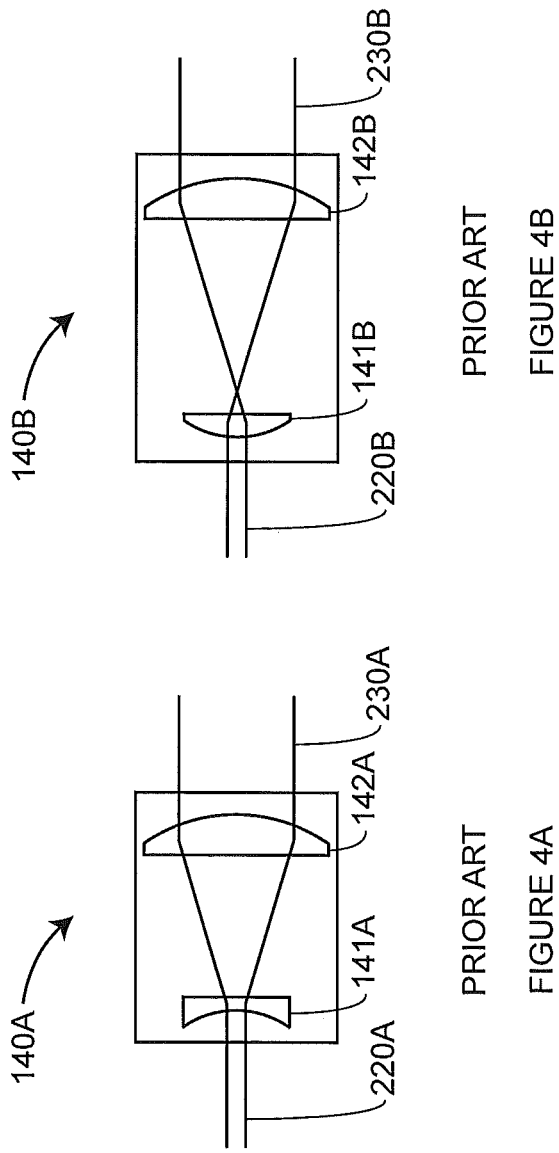
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
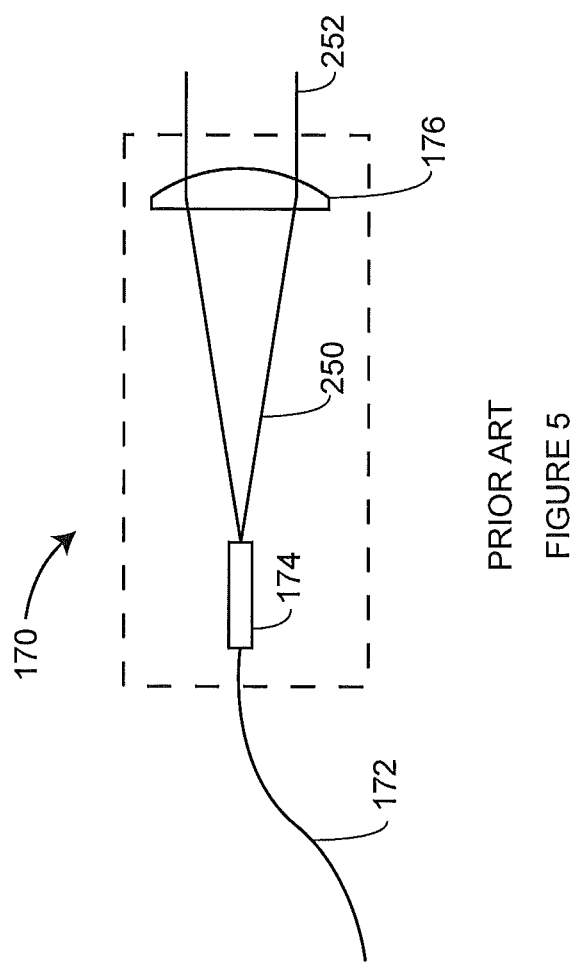
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
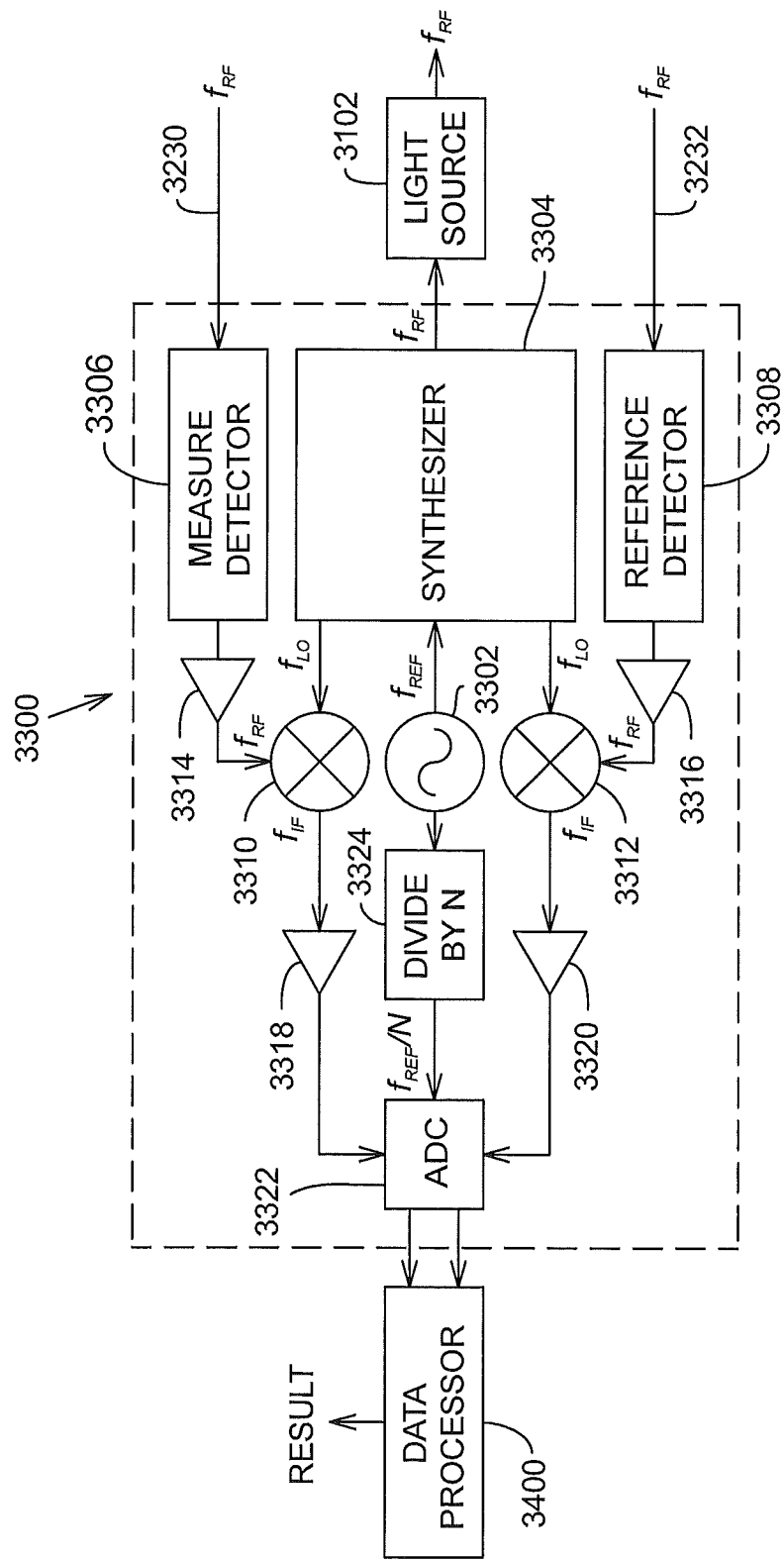
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
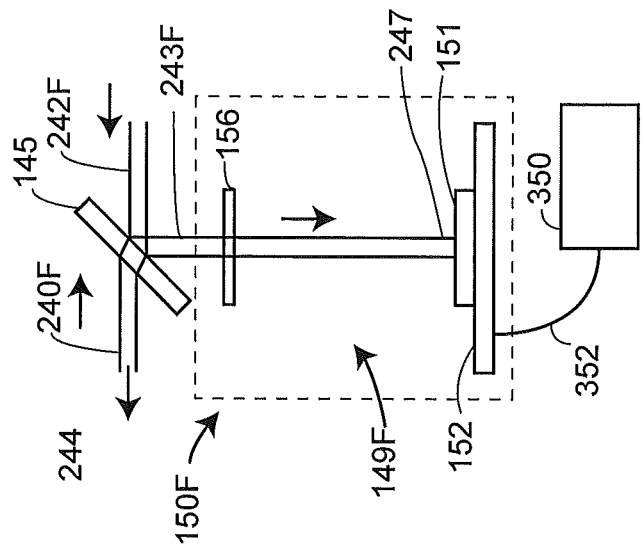
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
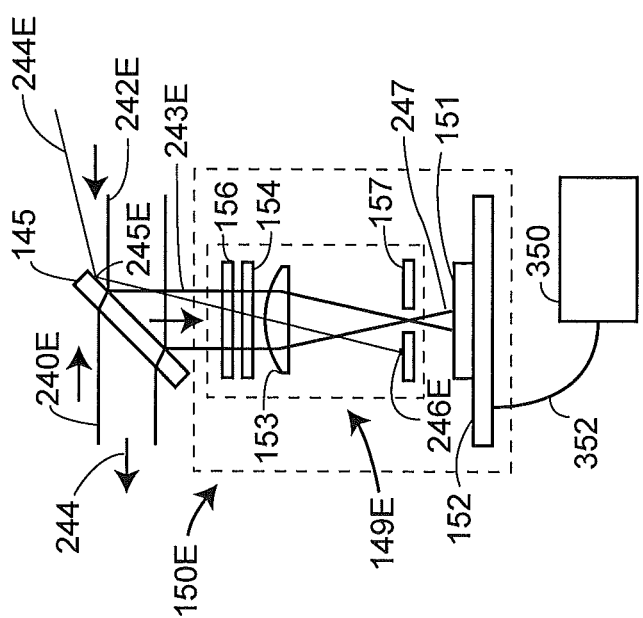

FIG. 6E shows a position detector assembly according to an embodiment of the present invention that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. Nos. 13/370, 339 filed Feb. 10, 2012, and 13/407,983, filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
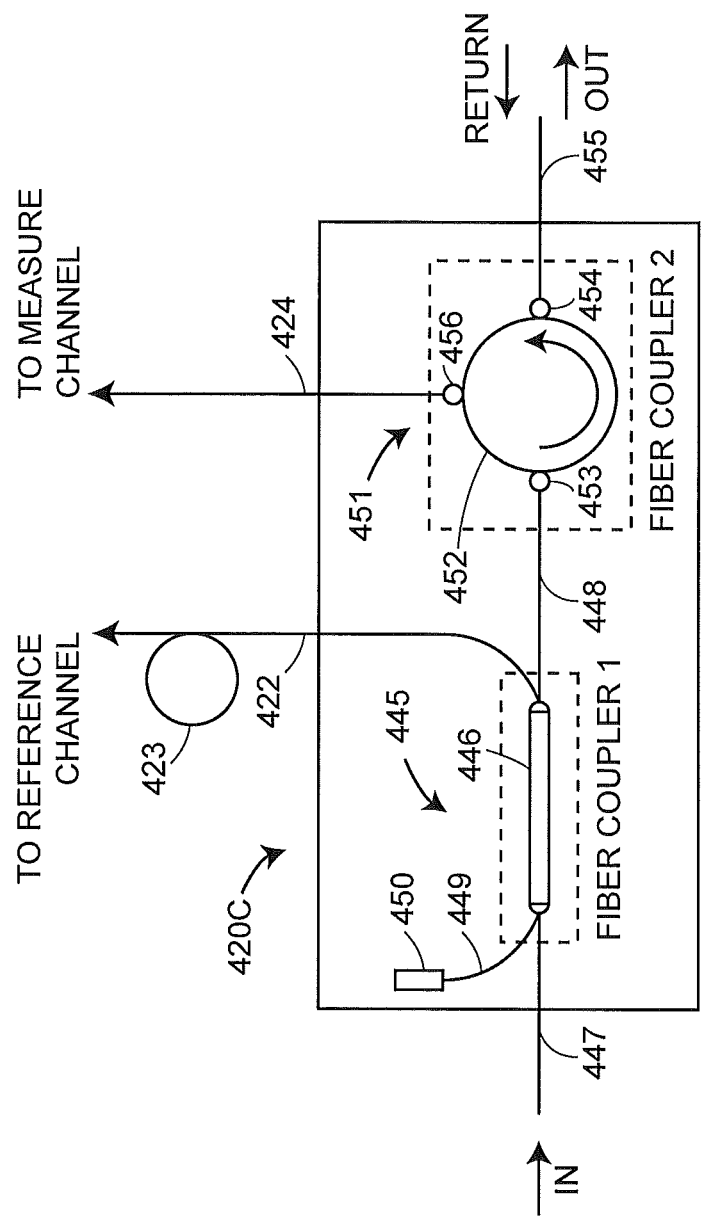
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
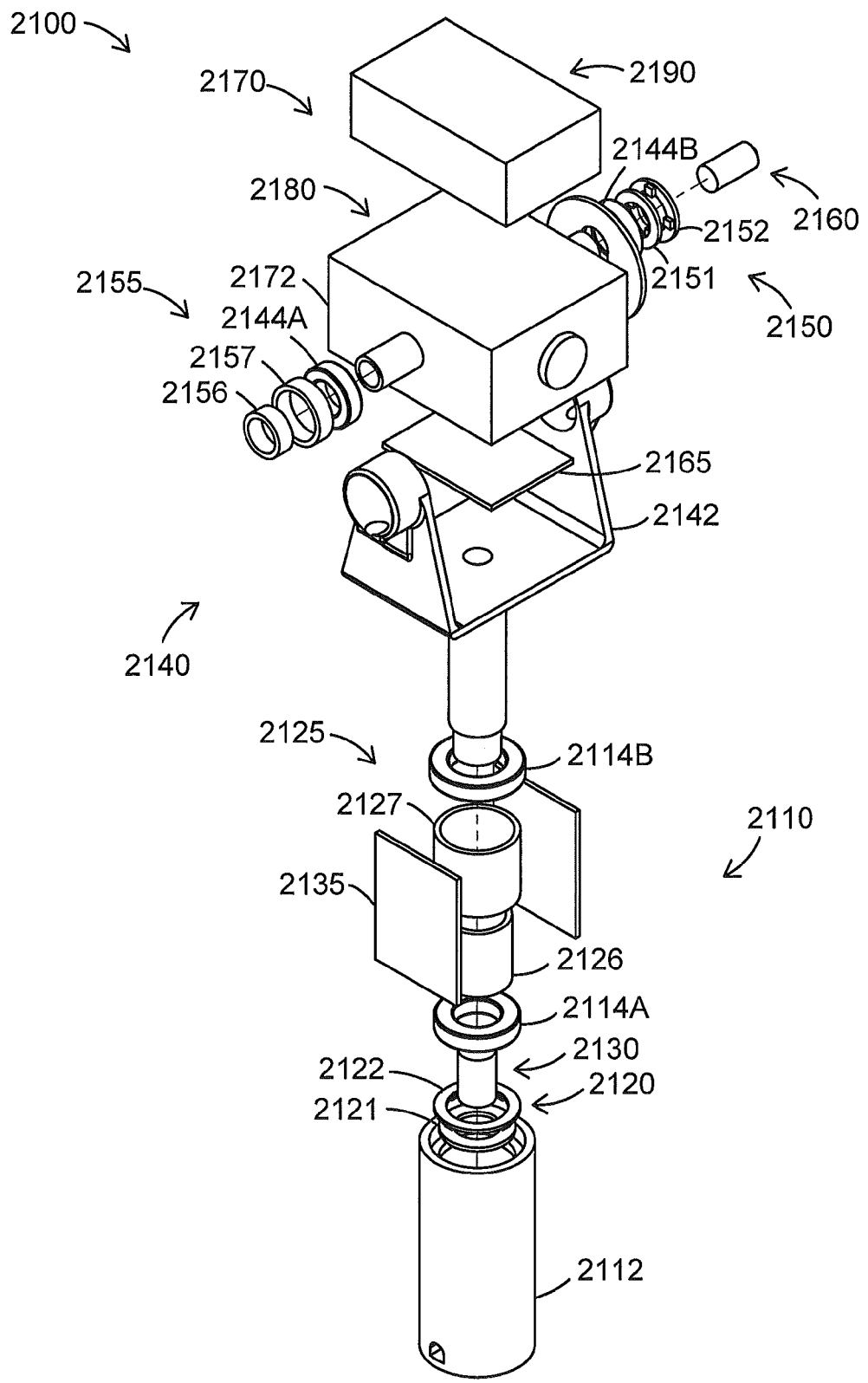
FIG. 9 is an exploded view of a prior art laser tracker.
Figure 10:
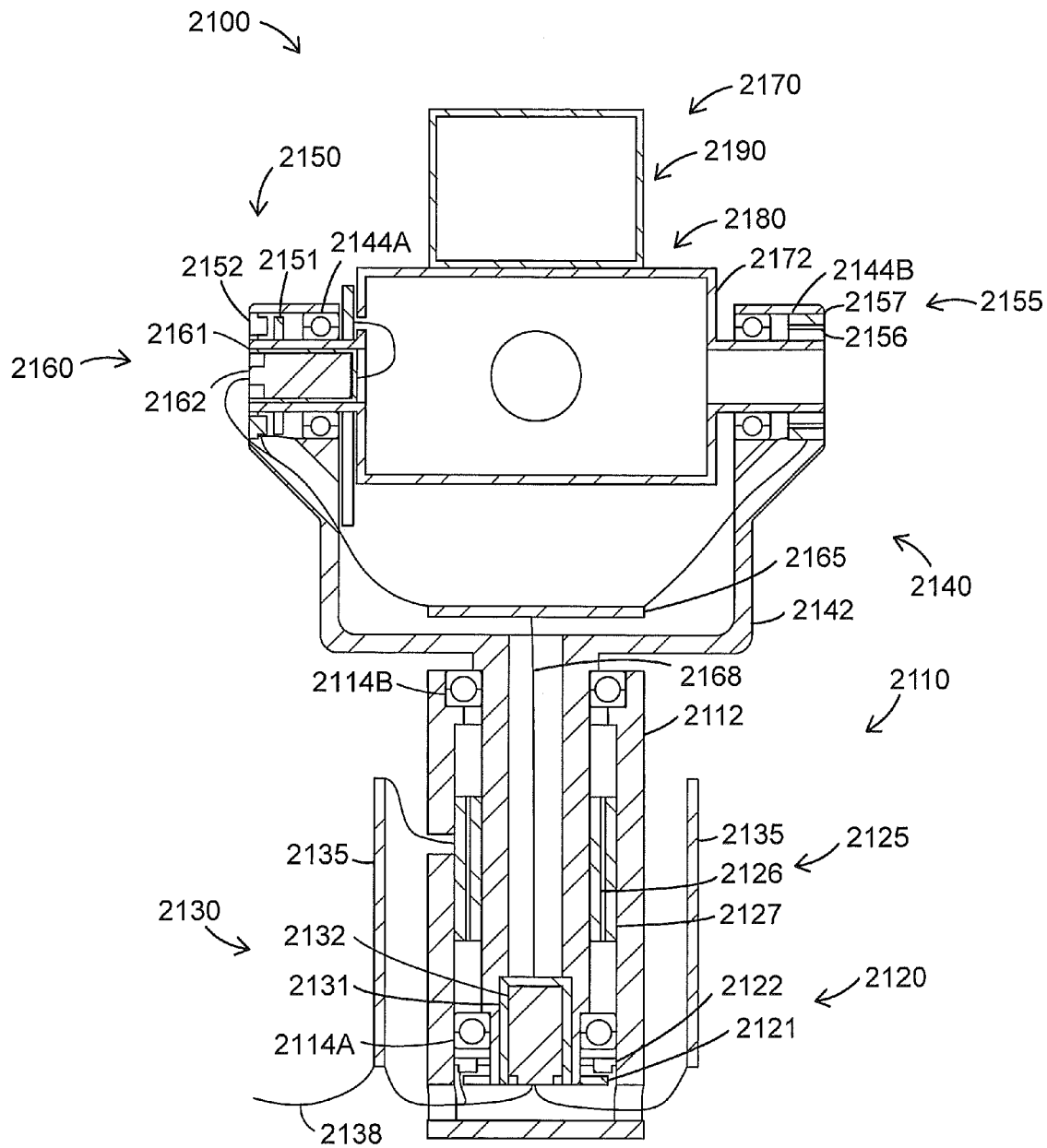
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith readhead assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
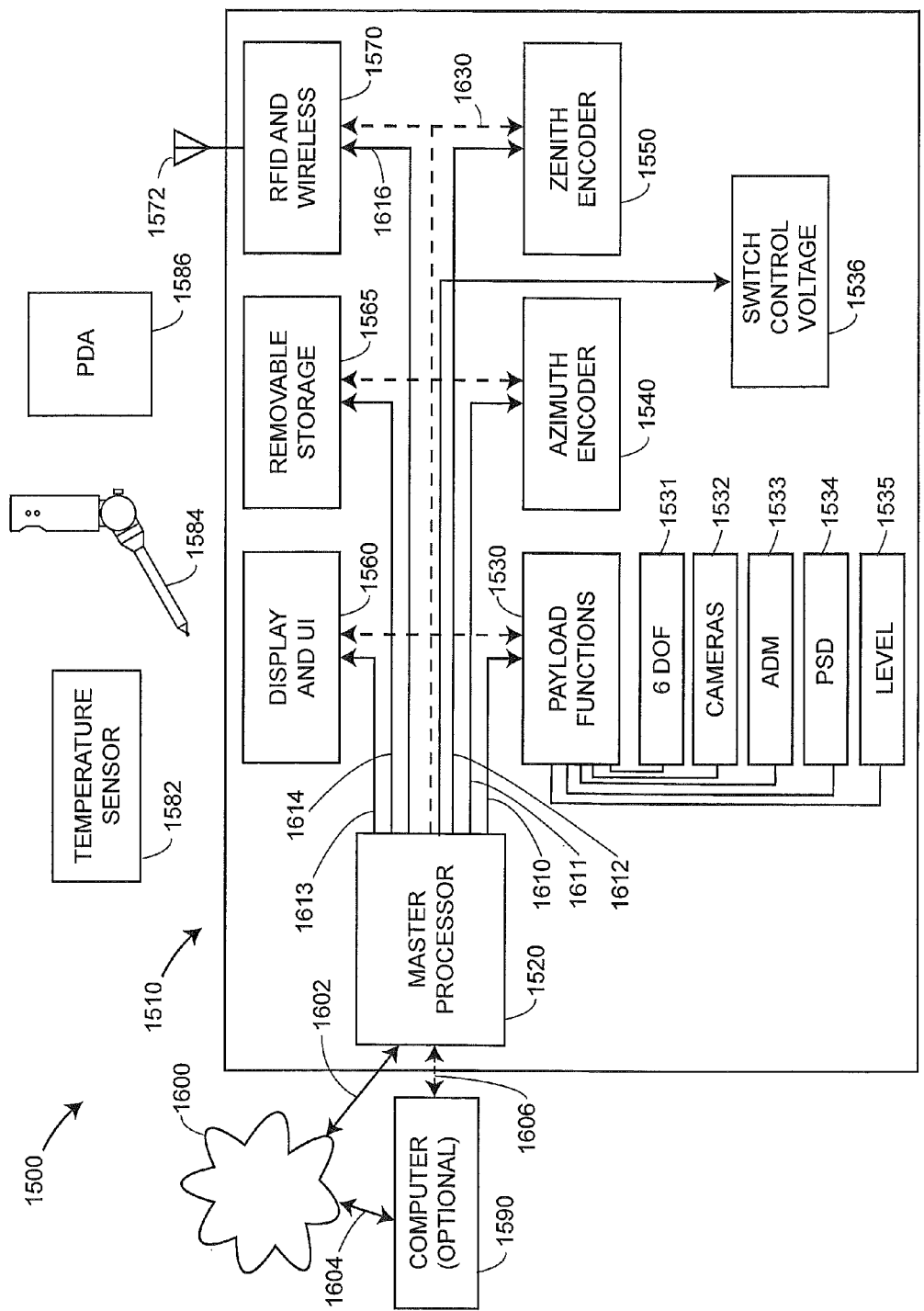
FIG. 11 is a block diagram of the computing and communication elements of a laser tracker in accordance to an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
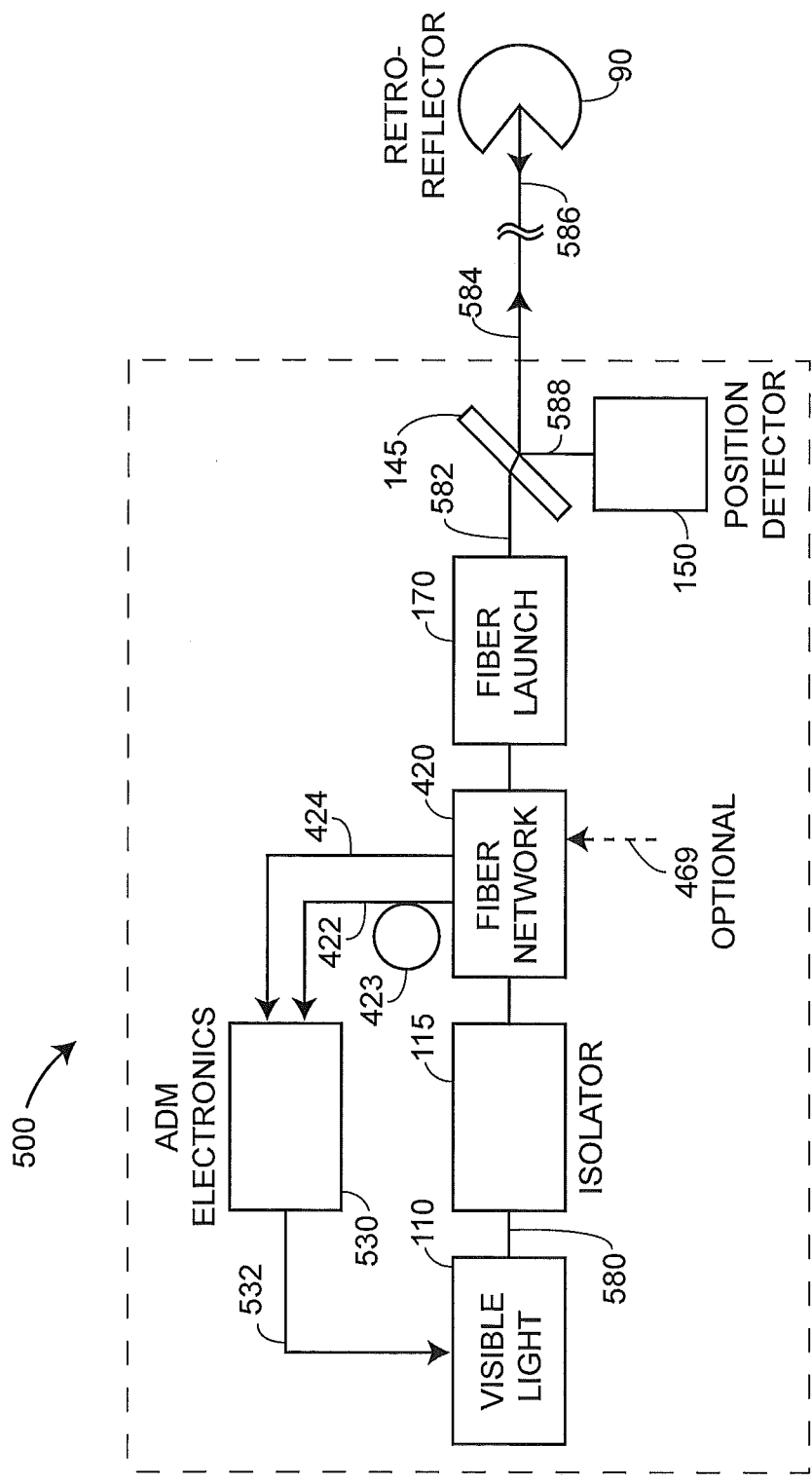
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
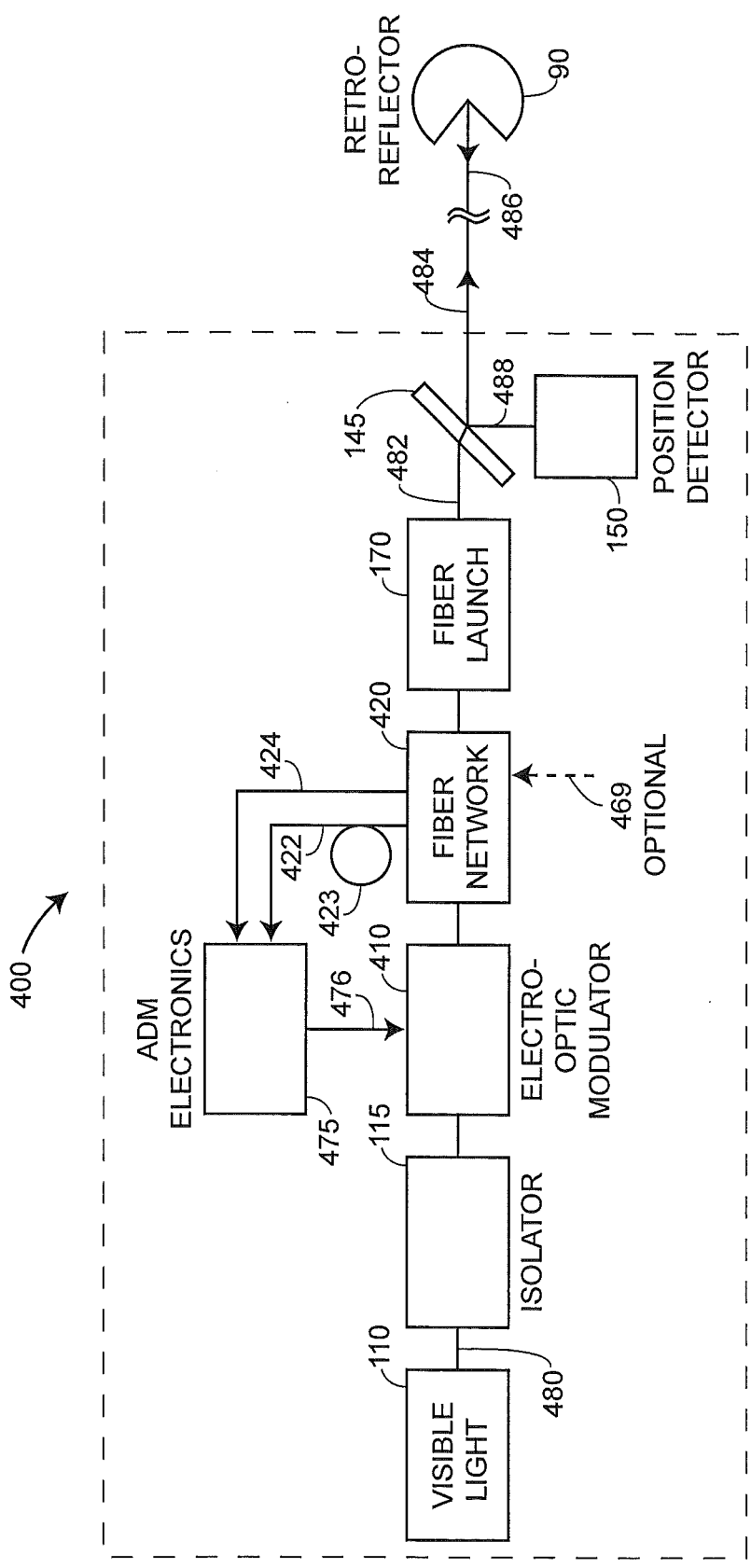
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
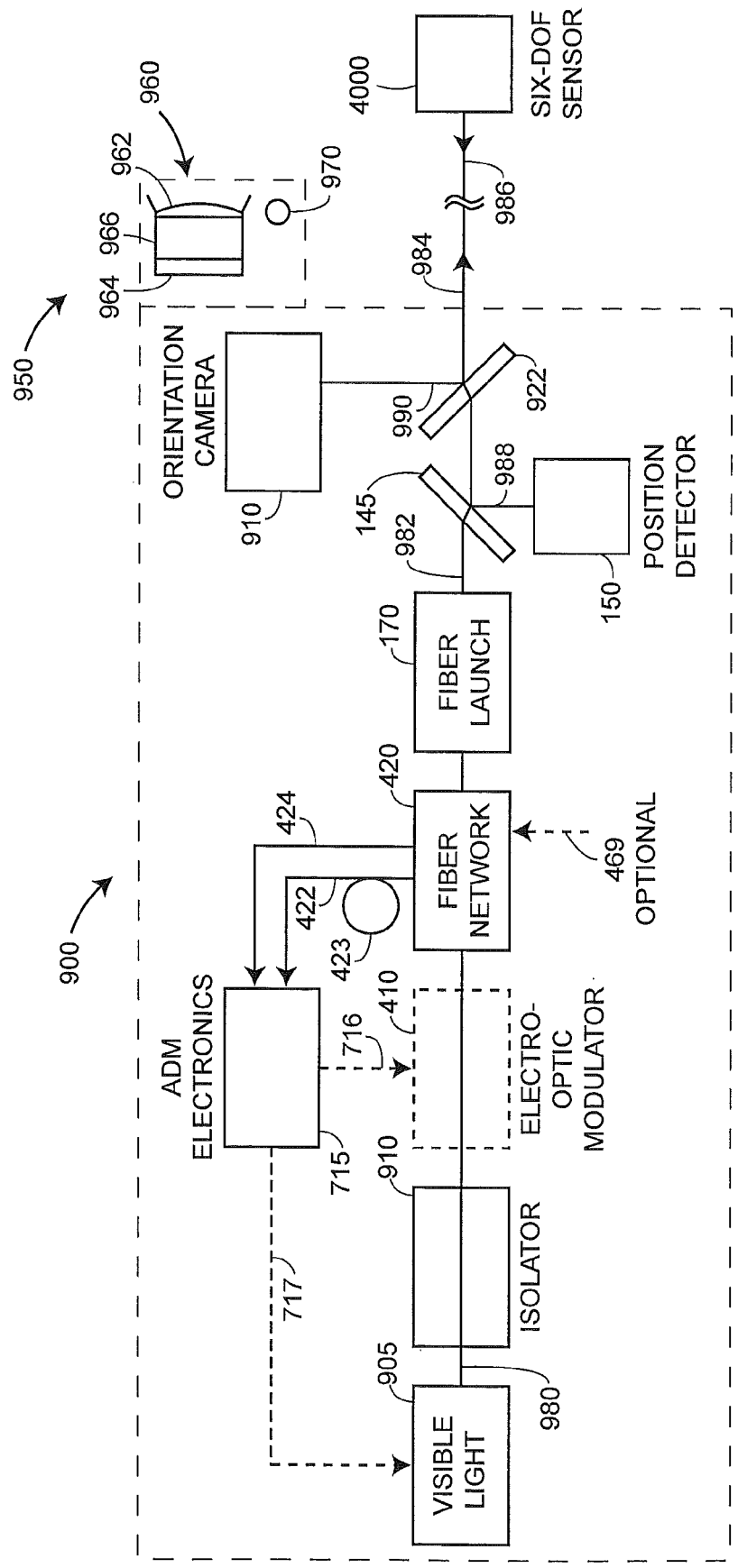
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the tracker to six degree-of-freedom (DOF) device 4000. The six-DOF device 4000 may be a probe, a scanner, a projector, a sensor, or other device.

On its return path, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe is found. The principles of the orientation camera are described hereinafter in the present application and also in patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown in FIG. 1, where the cameras are elements 52 and the light sources are elements 54. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14A:
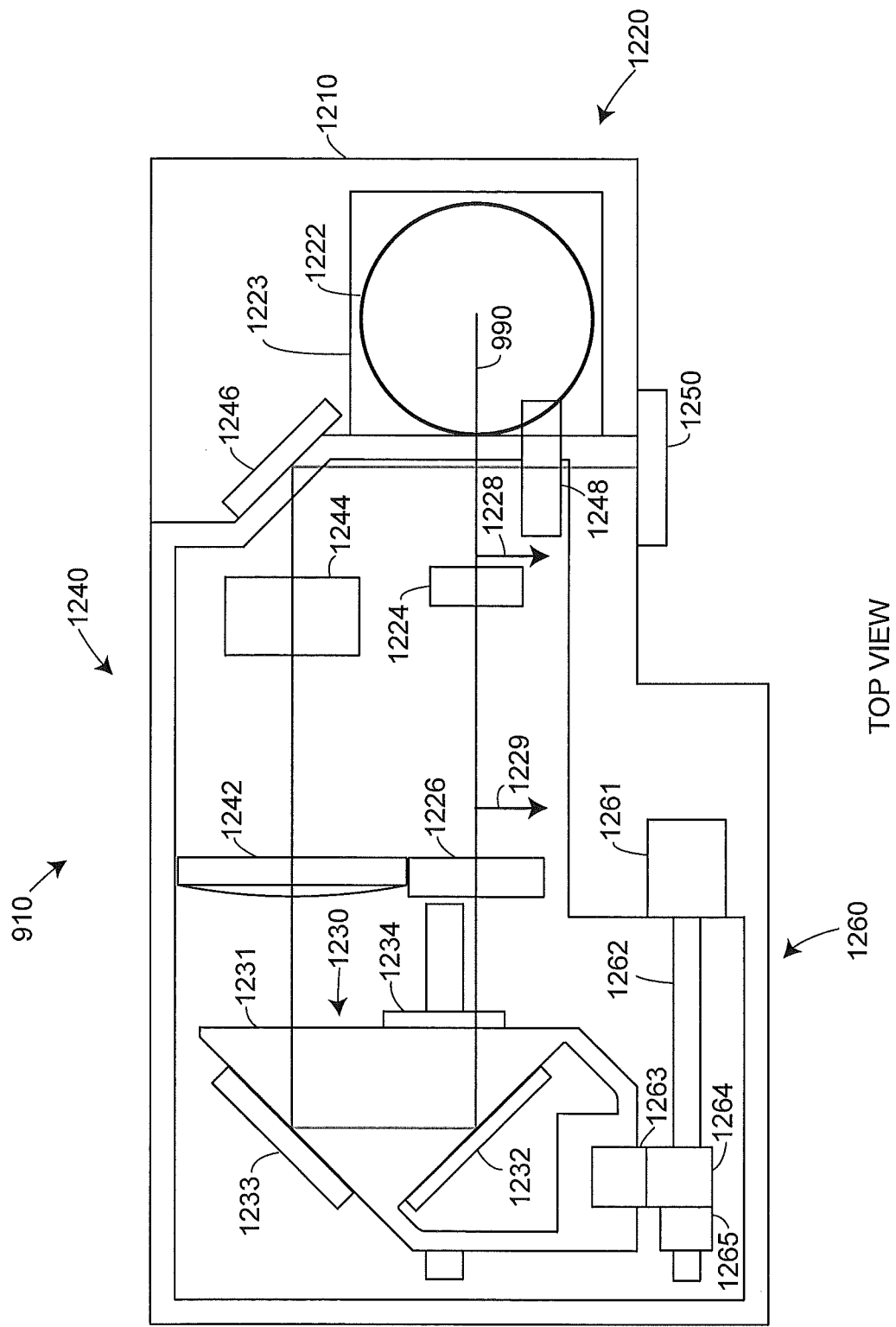
FIGS. 14A-D are a top view, side view, top sectional view, and side sectional view of an orientation camera according to two embodiments of the present invention.

FIG. 14A shows an embodiment of an orientation camera 910, which may be used in the optoelectronic systems of FIG. 13. The general principles of the orientation camera are described in patent '758 and are generally adhered to in orientation camera 910. In an embodiment, the orientation camera 910 includes a body 1210, an afocal beam reducer 1220, a magnifier 1240, a path length adjuster 1230, an actuator assembly 1260, and a photosensitive array 1250. The afocal beam reducer includes a positive lens 1222, a mirror 1223, and negative lenses 1224, 1226. The afocal beam reducer has the property that a ray of light that enters lens 1222 parallel to an optical axis—an axis that passes through the center of the lenses—emerges from lens 1226 also parallel to the optical axis. The afocal beam reducer also has the property that an image has a constant size regardless of the distance from the lens to an object. The magnifier 1240 includes a positive lens 1242, negative lenses 1244, 1248, and a mirror 1246. The magnifier has the same function as a microscope objective but is scaled to provide a larger image. The photosensitive array 1250 may, for example, be a CMOS or CCD array that converts the light that strikes it into an array of digital values representing the irradiance of the light at each pixel of the photosensitive array. The pattern of irradiance may reveal, for example, the marks on a six-DOF target. The path length adjuster 1230 includes a platform 1231, two mirrors 1232, 1233, and a ball slide 1234. The mirrors 1232, 1233 are mounted on the platform 1231 so that when the platform 1231 is moved, the distance between the afocal beam reducer 1220 and the magnifier 1240 is changed. This change in distance is needed to keep a clear image on the photosensitive array 1250 for a changing distance from the laser tracker to the target. The platform 1231 is mounted on the ball slide 1234, which provides the platform with low friction linear motion. In an embodiment, the actuator assembly 1260 includes a motor 1261, a motor shaft 1262, a flexible coupling 1263, an adapter 1264, and a motor nut 1265. The motor nut 1265 is fixedly attached to the adapter. As the threaded motor shaft 1262 is rotated by the motor 1261, the motor nut 1265 is moved either farther from or nearer to the motor, depending on the direction of rotation of the motor shaft. The flexible coupler 1263, which is attached to the adapter 1264, allows the platform to move freely even if the motor shaft 1262 and the ball slide 1234 are not parallel to one another.

In an embodiment, the orientation camera 910 provides constant transverse magnification for different distances to the target. Here transverse magnification is defined as the image size divided by the object size. The lenses shown in FIG. 27 were selected to produce a constant image size on the photosensitive array 1250 of 3 mm for an object size of 13 mm. In this instance, the transverse magnification is 3 mm/13 min=0.23. This transverse magnification is held constant for a target placed a distance from the tracker of between 0.5 meter and 30 meters. This image size of 3 mm might be appropriate for a ¼ inch CCD or CMOS array. In an embodiment, the transverse magnification is four times this amount, making it appropriate for a one inch CCD or CMOS array. An orientation camera with this increased transverse magnification can be obtained in the same size body 1210, by changing the focal lengths and spacings of the three lenses in the magnifier 1240.

In an embodiment shown in FIG. 13, the effective focal lengths of the three lens elements 1222, 1224, and 1226 of the beam reducer 1220 are 85.9 mm, −29.6 mm, and −7.2 mm, respectively. A virtual image is formed after the light from the object passes through these three lens elements. For an object placed 0.5 meter from the laser tracker, the virtual image 1229 has a size of 0.44 mm and is located 7 mm from the lens 1226. For an object placed 30 meters from the laser tracker, the virtual image 1228 has a size of 0.44 mm and is located 1.8 mm from the lens 1224. The distance between the virtual image 1228 and the virtual image 1129 is 39.8 mm, which means that the platform needs a maximum travel range of half this amount, or 19.9 mm. The transverse magnification of the beam reducer 1220 is 0.44 mm/13 mm=0.034. The effective focal lengths of the three lens elements 1242, 1244, and 1228 of the magnifier are 28.3 mm, −8.8 mm, and −8.8 mm, respectively. The size of the image at the photosensitive array 1250 is 3 mm for a target located 0.5 meter from the laser tracker, 30 meters from the laser tracker, or any distance in between. The transverse magnification of the magnifier is 3 mm/0.44 mm=6.8. The overall transverse magnification of the orientation camera is 3 mm/13 mm=0.23. In another embodiment, the transverse magnification of the magnifier is increased by a factor of 4 to 4×6.8=27, thereby producing an overall transverse magnification of 12 mm/13 mm=0.92 for any distance from 0.5 to 30 meters.

Figure 14B:
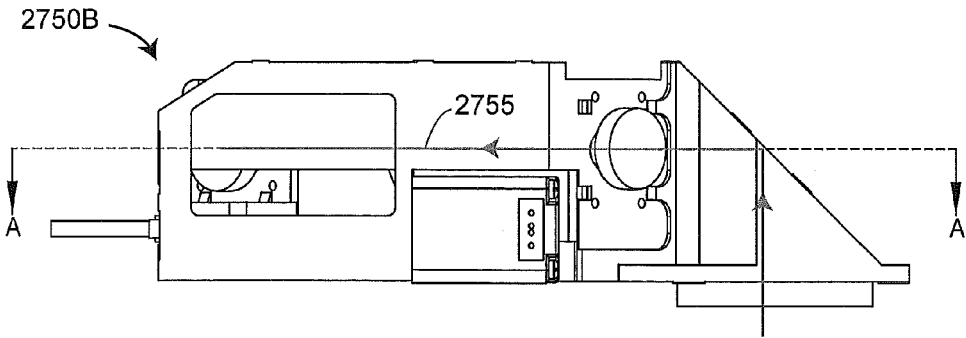
Figure 14C:
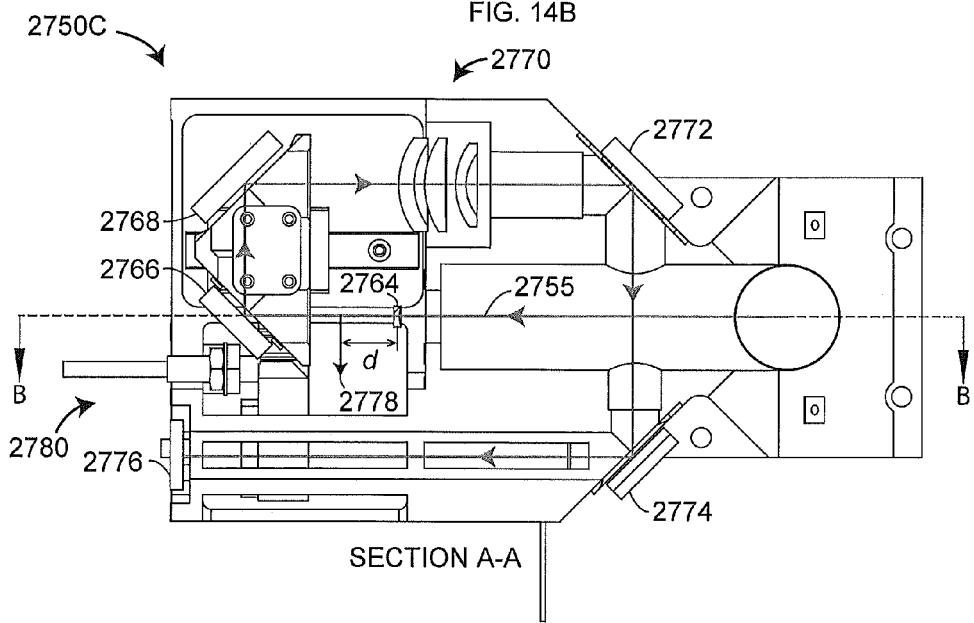
Figure 14D:
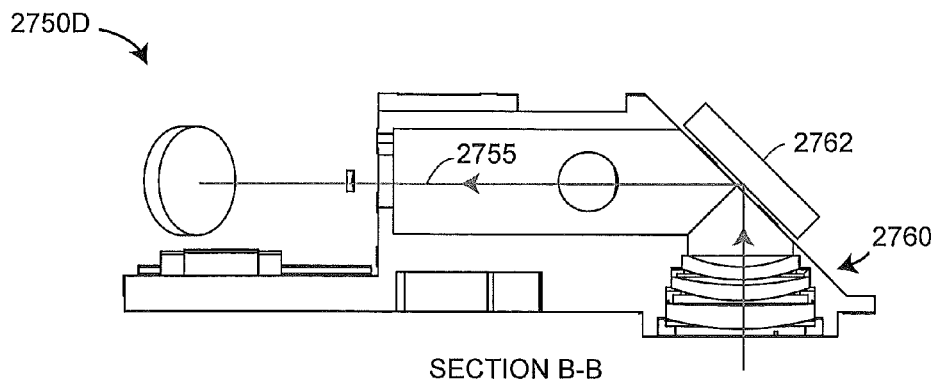

Another embodiment of an orientation camera is shown in FIGS. 14B-D. FIG. 14B is a side view of an orientation camera assembly 2750B. FIG. 14C is a top view 2750C of a section A-A shown in FIG. 14B. FIG. 14D is a side sectional view 2750D of a section B-B of FIG. 14C. The path of light beam 2755 is shown in each of the three figures. Light passes through a first collection of lenses 2760, reflects off mirror 2762, passes through lens 2764, reflects off mirrors 2766, 2768, passes through a section collection of lenses 2770, reflects off mirrors 2772, 2774, and strikes photosensitive array 2776. The first collection of lenses 2760 and the lens 2764 form an afocal lens system. As explained herein above, this means that a ray entering the first collection of lenses 2760 parallel to the optical axis will exit the lens 2764 parallel to the optical axis. Because the retroreflector (not shown in FIGS. 14B-D is a finite distance from the laser tracker, the afocal lens system will produce a virtual image 2778 at some distance from the lens 2764. This distance d from the lens 2764 will depend on the distance from the retroreflector from the laser tracker. For example, in an embodiment, the virtual image is about d=82 mm from the lens 2764 when the retroreflector is four meters from the tracker and about d=51 mm from the lens 2764 when the retroreflector is forty meters from the tracker. The second collection of lenses relays the virtual image 2778 onto the photosensitive array. A motorized actuator 2780 adjusts the position of mirrors 2766, 2768 in order to maintain the correct distance from the virtual image 2778 to the second collection of lenses 2770, thereby keeping the image on the photosensitive array 2776 in focus. In an embodiment, the first collection of lenses 2755 has a combined focal length of 112 mm, the lens 2764 has a focal length of −5.18 mm, and the second collection of lenses 2770 has a combined focal length of about 59.3 mm. The overall magnification of the system is approximately ⅛, which means that the size of the light pattern on the photosensitive array 2776 is about one-eighth the size of the light pattern on the retroreflector. This is an example of a lens system that maintains a constant magnification regardless of the distance from the laser tracker to the retroreflector.

Other combinations of lenses can be combined to make an orientation camera having a constant transverse magnification. Furthermore, although having constant transverse magnification is helpful, other lens systems are also useable. In general, the cameras of FIGS. 14A-D are distinguished by having a zoom capability, a narrow field of view, and an alignment with the optical axis of the laser tracker.

One type of laser tracker available today uses a mirror to steer a beam of light. Another type of laser tracker launches a beam of light directly from a payload assembly, for example, like that of payload assembly 2170 of FIGS. 9, 10 or payload 15 of FIG. 1. For the case in which the beam of light is launched directly from a payload assembly, prior art trackers have required alignment steps to be carried out after optical components and light sources are assembled into the laser tracker. A difficulty with this approach is that problems, once encountered, are difficult to remedy. Such problems sometimes occur during the manufacturing process and at other times occur while a laser tracker in use by a customer. The result is time-delay and extra cost to fix the problems. The embodiments now described provide a way around these shortcomings found in prior art laser trackers.

Figure 15:
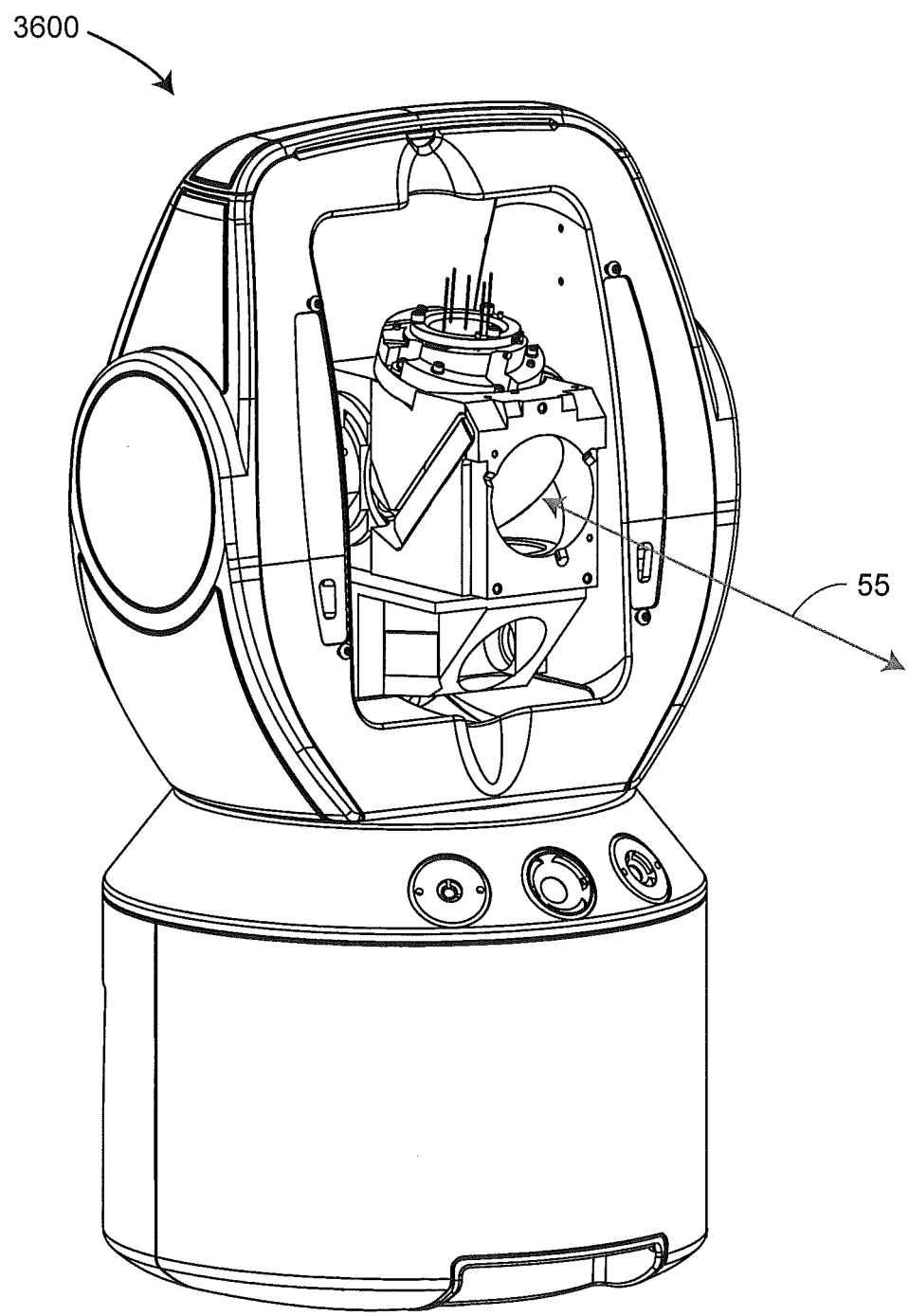
FIG. 15 is a perspective view of a laser tracker with covers off and optics block removed according to an embodiment of the present invention.
Figure 16:
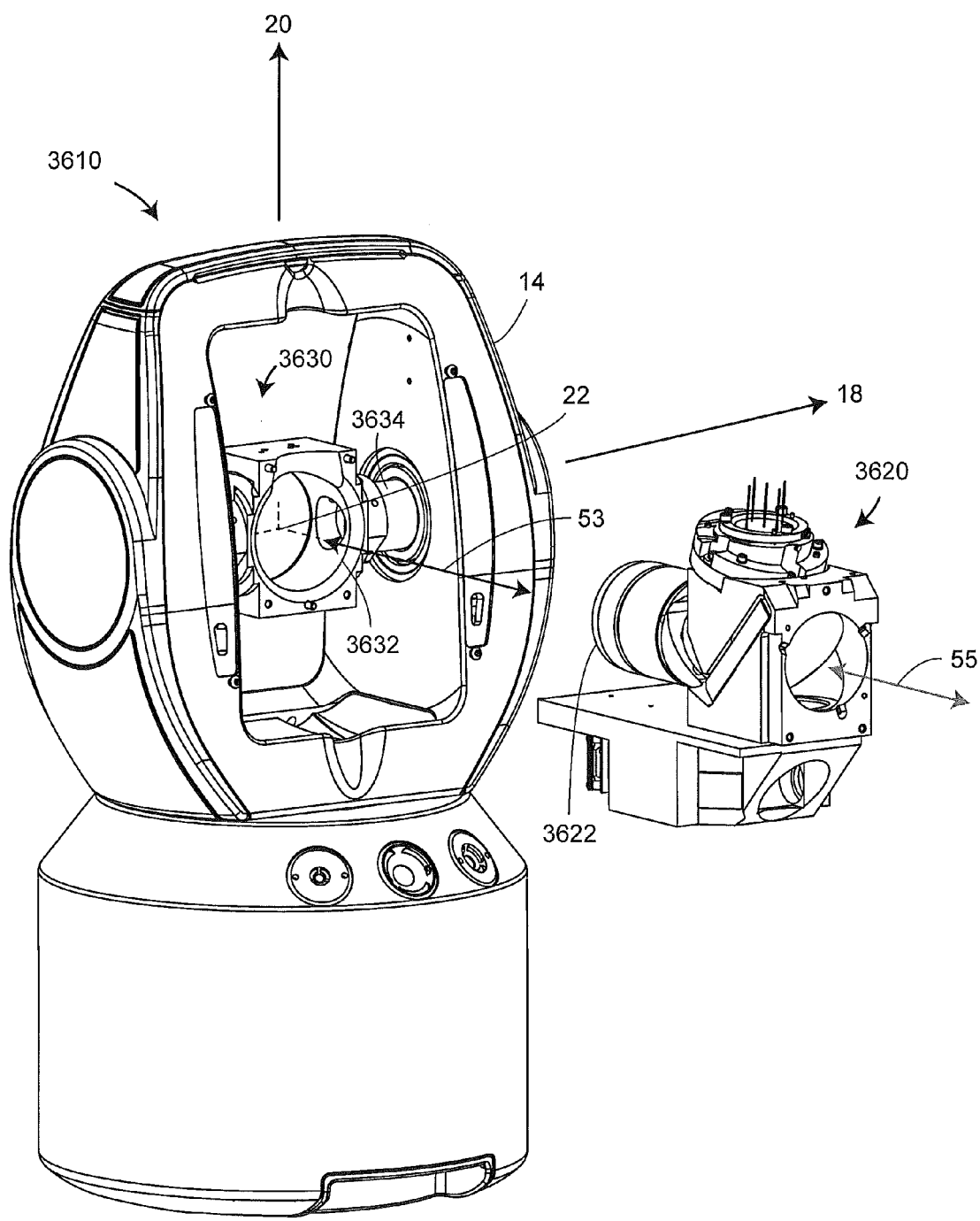
FIG. 16 is an exploded view showing an optics bench in relation to other elements of a laser tracker according to an embodiment of the present invention.
Figure 17:
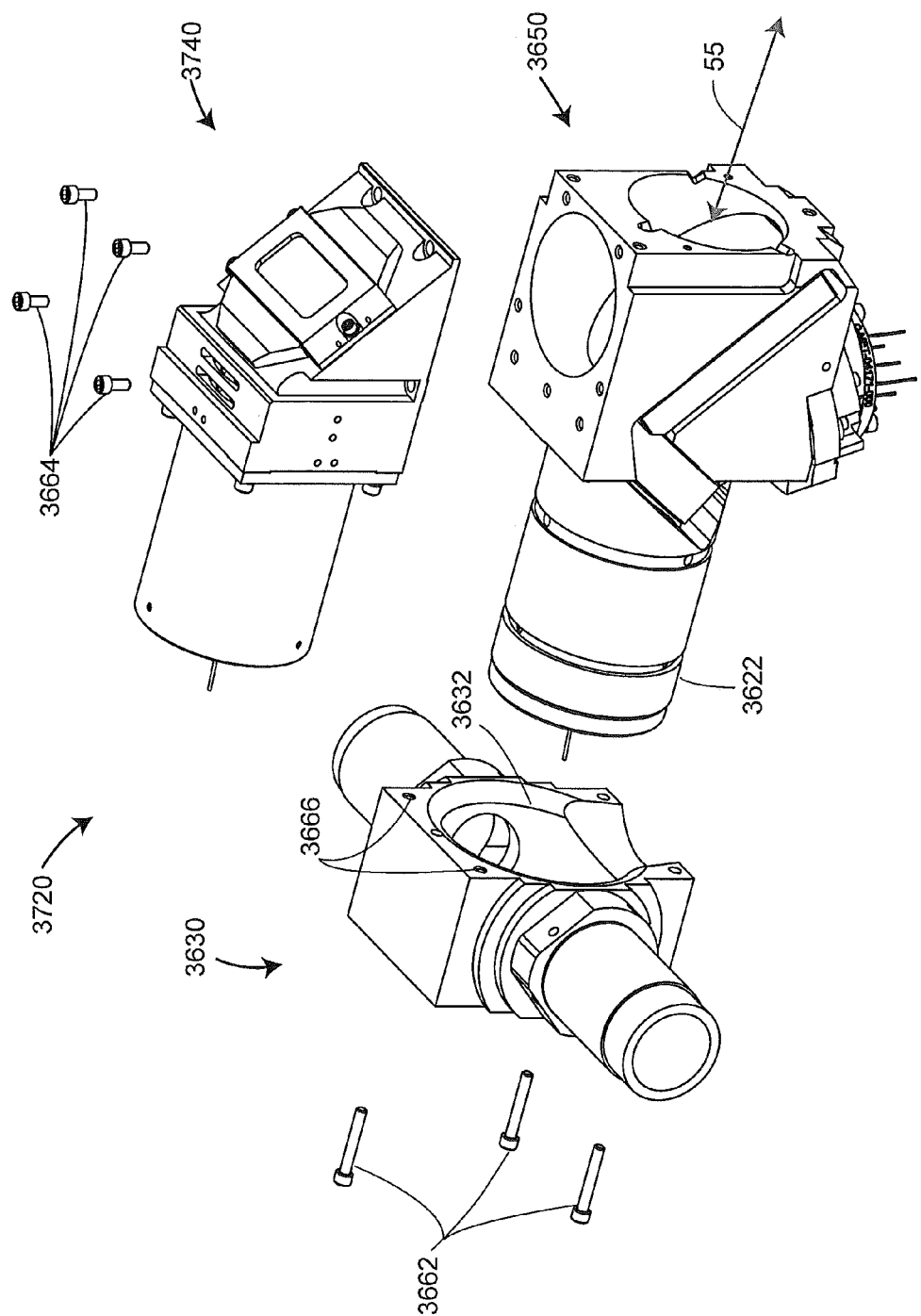
FIG. 17 is an exploded view of a zenith shaft, an optics bench, and a first optics assembly in accordance with an embodiment of the present invention.
Figure 18:
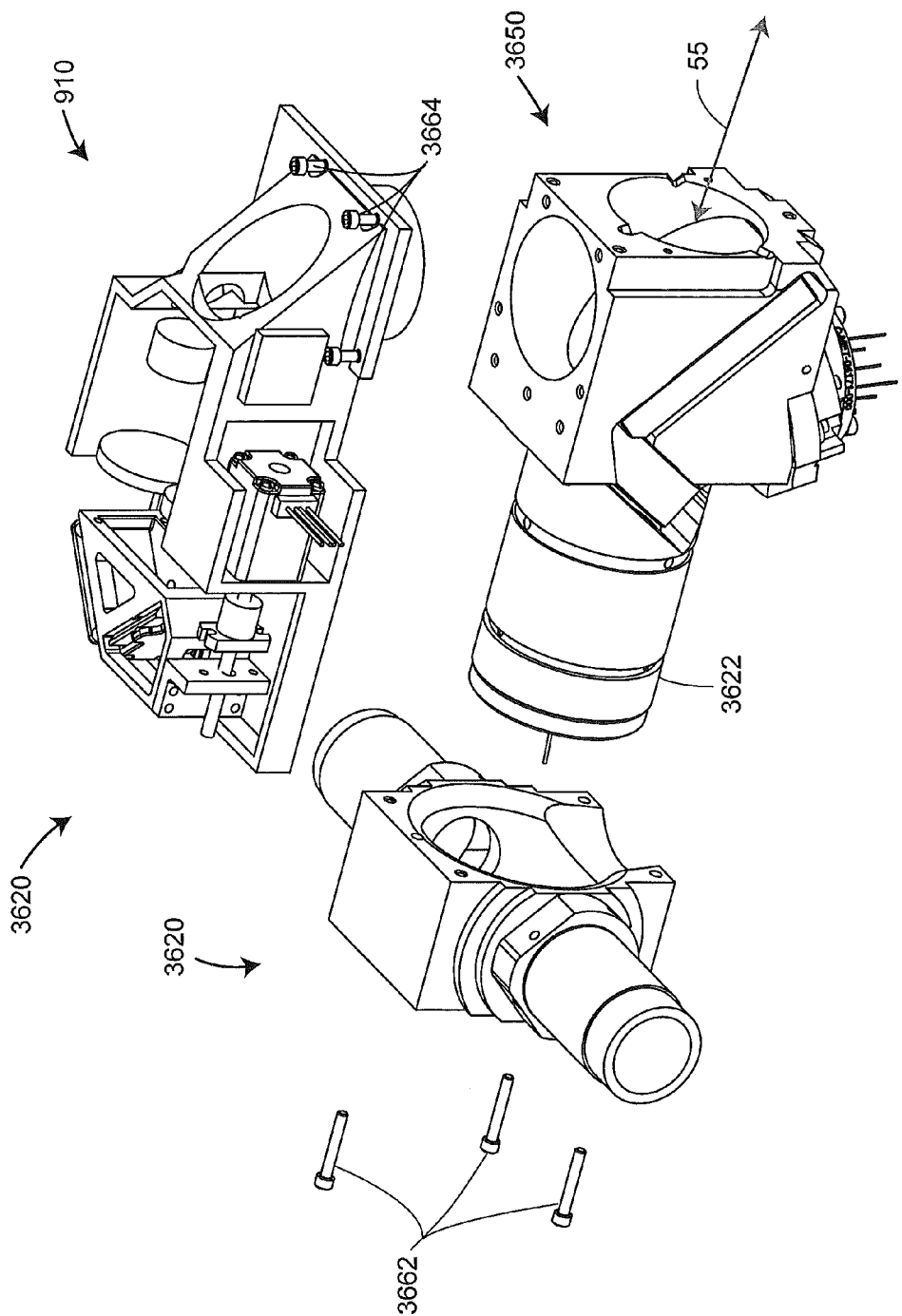
FIG. 18 is an exploded view of a zenith shaft, an optics bench, and a second optics assembly in accordance with an embodiment of the present invention.

FIG. 15 shows an embodiment of a laser tracker 3600 with front covers removed and some optical and electrical components omitted for clarity. As shown in FIG. 16, in an embodiment, the optics bench assembly 3620 includes a mating tube 3622. FIG. 16 shows a gimbal assembly 3610, which includes a zenith shaft 3630, and the optics bench assembly 3620. The zenith shaft includes a shaft 3634 and a mating sleeve 3632. The zenith shaft 3630 may be fabricated of a single piece of metal in order to improve rigidity and temperature stability. FIG. 17 shows an embodiment of an optics bench assembly 3720 and a zenith shaft 3630. The optics bench assembly 3720 includes a main optics assembly 3650 and a secondary optics assembly 3740. The housing for the main optics assembly 3650 may be fabricated out of a single piece of metal to improve rigidity and temperature stability and includes a mating tube 3622. In an embodiment, the central axis 55 of the mating tube 3622 is aligned with the central axis 53 of the mating sleeve 3632. In an embodiment, four screws 3664 attach the secondary optics assembly 3740 to the main optics assembly 3650 as shown in FIGS. 17 and 18. The mating tube 3622 is inserted into the mating sleeve 3632 and held in place by three screws 3662. In an embodiment, the mating tube 3622 is aligned with the mating sleeve 3632 by means of two pins on one end of mating tube 3622, the pins fitting into holes 3666 shown in FIG. 17.

Although the gimbal assembly 3610 is designed to mate with the optical bench 3620, other types of devices such as a camera, a laser engraver, a video tracker, a laser pointer and angle measuring device, or a LIDAR system could be disposed on the zenith shaft 3630. Because of the alignment registration provided by the mating sleeve 3632, such devices could be easily and accurately attached to the gimbal assembly 3610.

In an embodiment, the main optics assembly 3650 of FIG. 17 includes elements within FIG. 3. These elements include the visible light source 110, the isolator 115, the optional IFM 120, the quarter waveplate 130, the beam expander 140, the beam splitter 145, the position detector 150, and the beam splitter 155. The secondary optics assembly 3740 includes the fiber launch 170 and the ADM assembly 160 from FIG. 3. In other embodiments, alternative optoelectronics systems may be used.

FIG. 18 shows an embodiment of an optics bench assembly 3620 removed from the laser tracker payload. The secondary optics assembly 910 is the orientation camera 910 of FIG. 13, and the main optics assembly 3650 includes the rest of the elements within the optoelectronics system 900 of FIG. 13.

Figure 19:
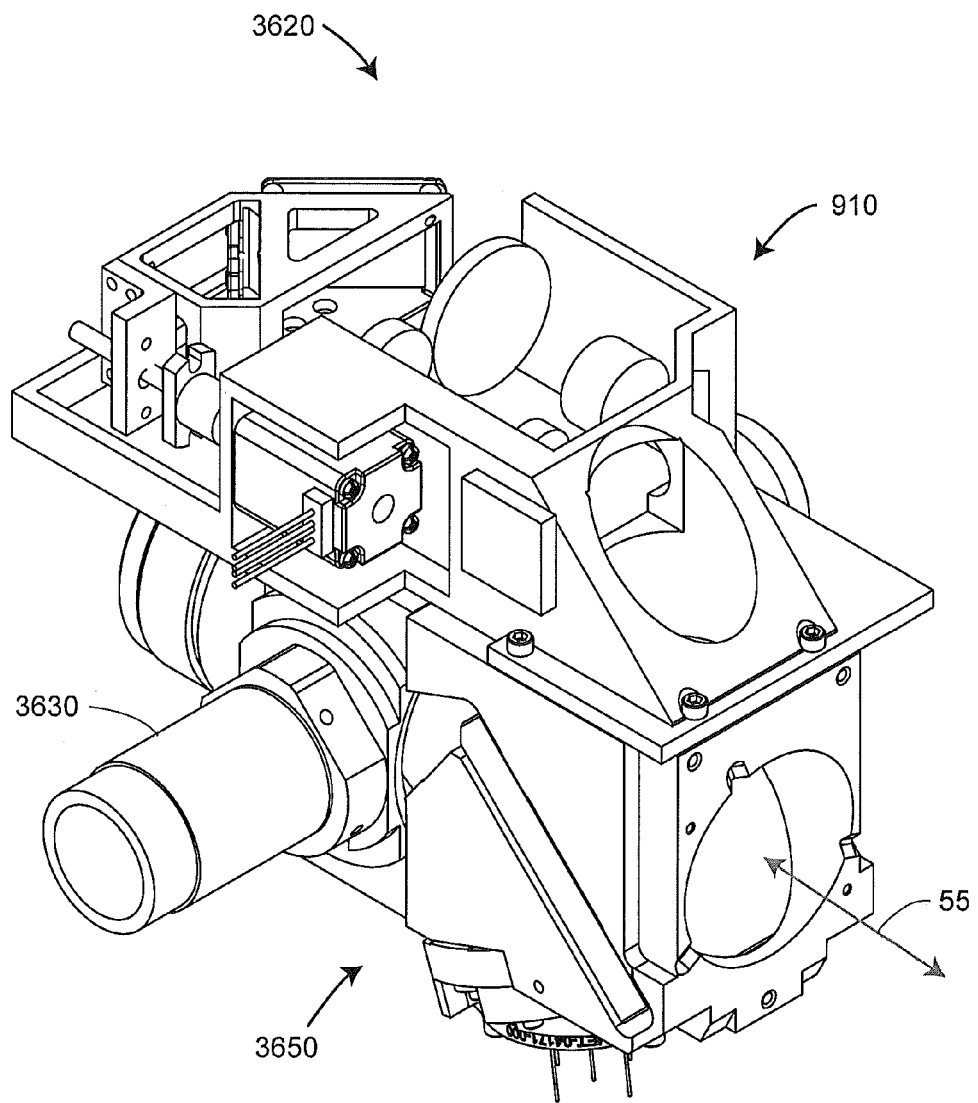
FIG. 19 is a perspective view of a zenith shaft, an optics bench, and a second optics assembly assembled together in accordance with an embodiment of the present invention.
Figure 20:
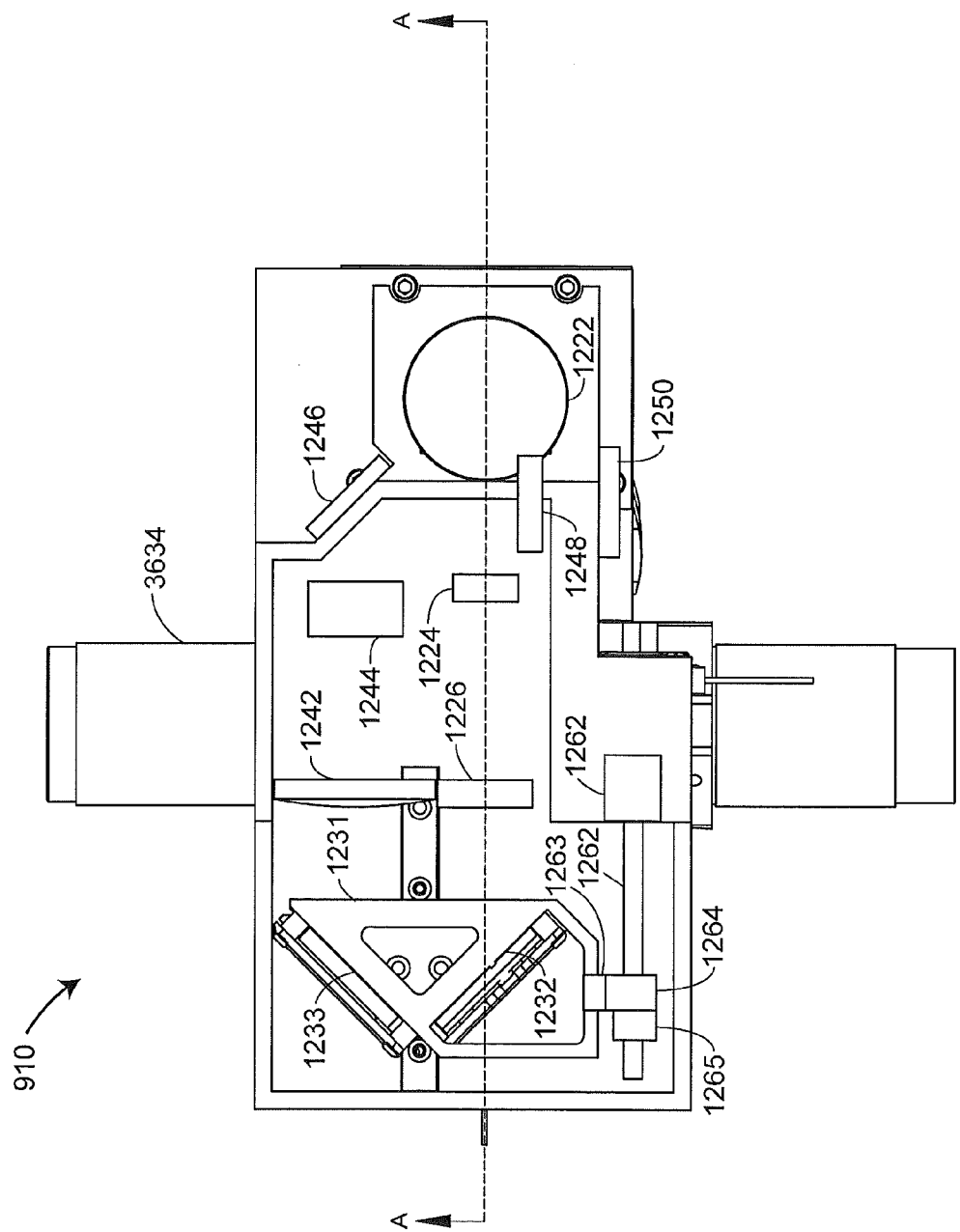
FIG. 20 is a top view of an orientation-camera optics assembly in accordance with an embodiment of the present invention.
Figure 21:
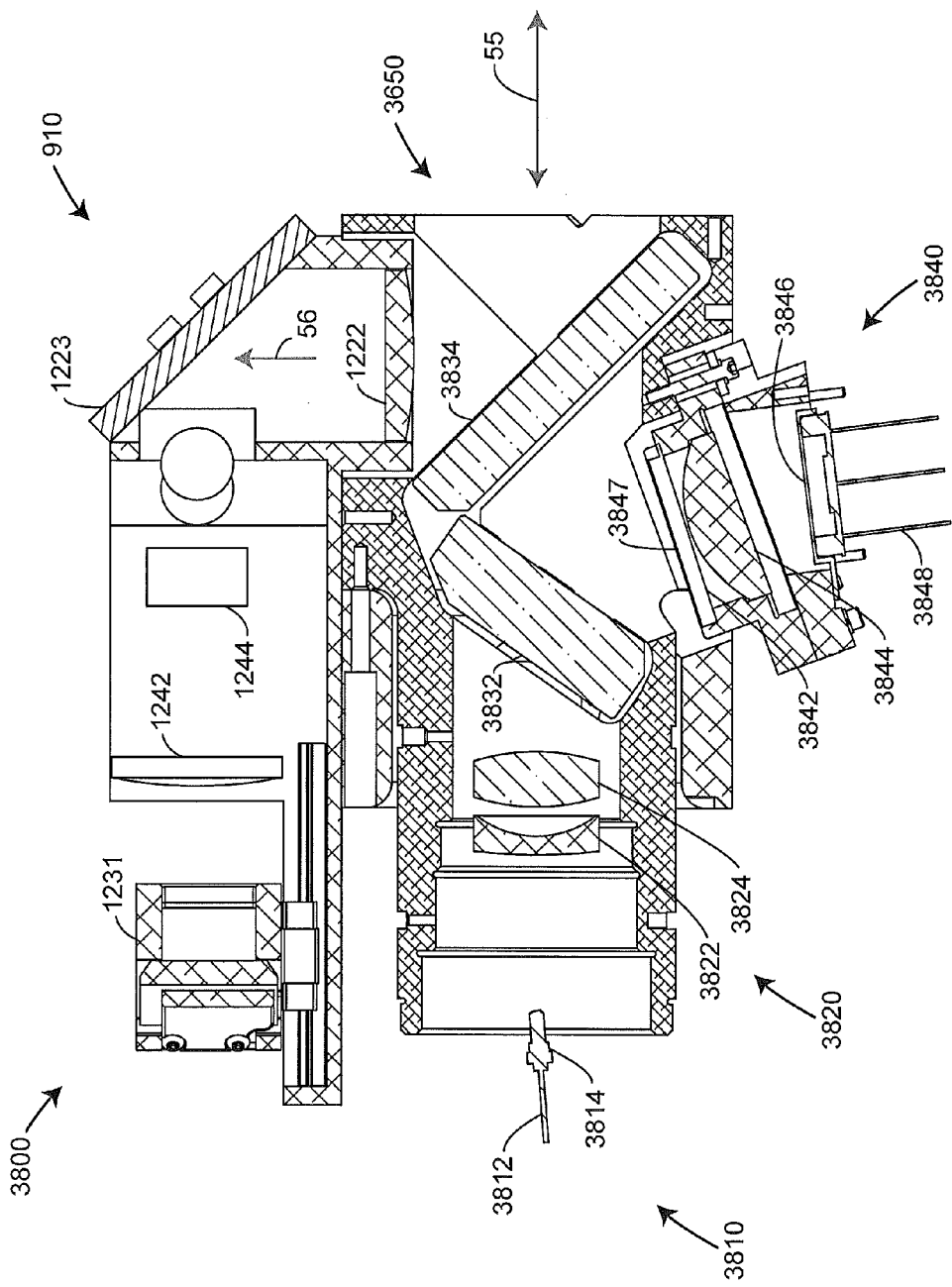
FIG. 21 is a cross-sectional view of an optics bench, an optics assembly, and a position detector assembly in accordance with an embodiment of the present invention.

FIG. 19 shows an isometric view of an embodiment of the optics bench assembly 3620 and the zenith shaft 3630. The optics bench assembly 3620 includes the main optics assembly 3650 and the secondary optics assembly 910. FIG. 20 shows a top view of the orientation camera of the secondary optics assembly 910. These elements were previously described with reference to FIG. 14A. FIG. 21 shows a cross sectional view 3800 along line A-A of FIG. 20. In an embodiment, visible laser light is sent through an optical fiber 3812. The light source that puts light into the optical fiber, the fiber network (if any) over which the light is routed, and the optical fiber 3812 all rotate along with the optics bench assembly 3620. In an embodiment, the optical fiber 3812 includes a connector, which enables quick disconnect from the optical fiber originating at the light source. If the light source provides visible light, then the light can serve as both a pointer beam visible to an operator and as a measurement beam that can be used for measurements of distances, angles, and the like. The laser light is launched from a ferrule 3814, which may be mechanically adjusted to point the laser beam in the desired direction. In an embodiment, the ferrule 3814 and the face of the fiber held by the ferrule and polished at an angle of approximately 8 degrees to reduce backreflection of light in the optical fiber. The ferrule is adjusted to cause the beam emitted by the optical fiber to travel parallel to the central axis 55 of the mating tube 3622. The cross sectional view 3800 shows that light from the ferrule 3814 passes through lenses 3822 and 3824 in this case, although many different lens arrangements could be used. The light passes through beam splitter 3832 and beam splitter 3834 out of the tracker to a retroreflector target (not shown). On the return path from the retroreflector target, some of the light reflects off the beam splitter 3834, passes through lens 1222, reflects off mirror 1223 and continues through a variety of optical elements as explained hereinabove with reference to FIG. 14A. The rest of the light passes though beam splitter 3834 and travels to beam splitter 3832, where some of it reflects, travels through optical diffuser/filter 3847, through lens 3844, and strikes position detector 3846. The light may also pass through an aperture placed between the lens 3844 and the position detector 3846. The purpose of such an aperture is to block ghost beams. In this case, the position detector is moved farther from the lens 3844 so that the aperture can be placed at a focal position of the beam of light (as shown in FIG. 6E). In an embodiment, the position detector 3846 is tilted so as to cause the backreflected light to be reflected at an angle, thereby reducing the chance that light reflected off the surface of the position detector 3846 will bounce off another surface (for example, the surface of an aperture/spatial filter 157) and return to the position detector. Position detector leads 3848 are attached by means of pass-through sockets (not shown) to a circuit board (not shown) that rotates with the optics bench assembly. Pass through sockets are spring loaded sockets that allow electrical connection to be made without soldering components. These sockets are advantageous because they enable the optics bench to be easily removed and replaced in a quick repair operation. The light that does not travel to the position detector 3846 continues through beam splitter 3832, optical elements 3824, 3822, which focuses it into the optical fiber 3812 within the ferrule 3814.

Although the arrangement described herein includes a fiber launch having a ferrule 3814 and an optical fiber 3812, it will be recognized to one of ordinary skill in the art that the fiber launch could be replaced by a discrete light source such as a laser diode attached fixedly to the assembly 3650. Electrical power could be run to the discrete light source with electrical wiring that could be detached at a socket, thereby making the assembly easy to replace.

As discussed herein above, an advantage of the design of the optics bench assembly 3650 is that it may be easily aligned outside the laser tracker and inserted into any gimbal assembly 3600, 3610. It may also be inserted into other types of gimbal assemblies configured to accept a rotatable optics bench assembly. Advantages of having a removable bench assembly including faster production and easier repair.

To obtain a prealigned assembly that can be conveniently replaced in a gimbal mounted device such as a laser tracker, it is not necessary that the prealigned assembly be aligned to the intended accuracy of the measuring instrument. For example, a laser tracker may have an accuracy of approximately 25 micrometers under some conditions, but this does not mean that the prealigned assembly must maintain a similar accuracy when assembled into the laser tracker. Following the replacement of a prealigned assembly into the laser tracker, a series of compensation procedures can be carried out to correct for slight misalignments in the optical and mechanical elements. In an embodiment of a laser tracker device, three such compensations might be carried out: a pointing compensation, an R0 compensation, and a position detector compensation.

A pointing compensation may be carried out measuring some combination of retroreflectors and mirrors at a variety of distances and angles relative to the laser tracker. At each location, the retroreflector or mirror is measured in frontsight mode and backsight mode. The frontsight mode is considered the normal mode of operation of the instrument. The backsight mode is obtained by starting with the frontsight mode, rotating the tracker payload by 180 degrees about the azimuth axis and then rotating the tracker payload about the zenith axis to point back at the target retroreflector or target mirror. In an ideal tracker, the three-dimensional coordinates measured in frontsight and backsight modes are identical, but in a real tracker, the readings vary slightly. These differences in readings can be analyzed to obtain parameters that indicate an offset distance of the beam of light emitted from the tracker relative to the gimbal point. Compensation parameters associated with these offset distances are sometimes referred to as TX and TY parameters. The differences in readings can also be analyzed to obtain parameters that indicate an angular deviation of the laser beam with respect to the plane that contains the azimuth axis and is perpendicular to the zenith axis. Compensation parameters associated with these angular deviations are sometimes referred to as RX and RY parameters.

An R0 value is a distance from the gimbal point of a laser tracker to a reference position, which might be for example the position of an SMR at one of the magnetic nests 17 on the front of the tracker as shown in FIG. 1. The R0 distance for an interferometer or ADM within the laser tracker may be found by carrying out a procedure in which the distance meter is used to measure a distance between two SMRs aligned with the tracker gimbal point, first with the tracker outside the nests and second with the tracker in between the nests. By comparing the measured values, an R0 error can be calculated and the result stored in one or more compensation parameters.

A position detector compensation is intended to find the two dimensional distance of the position detector retrace position compared to the center of the position detector. The meaning of the retrace position (or retrace point) was discussed hereinabove in reference to FIG. 3. Compensation values are provided for the retrace offset distances.

Because the compensations described above are relatively quick and easy to perform, it is feasible to replace an optics bench within a laser tracker or other gimbal instrument without need to have perfect alignment.

Figure 22:
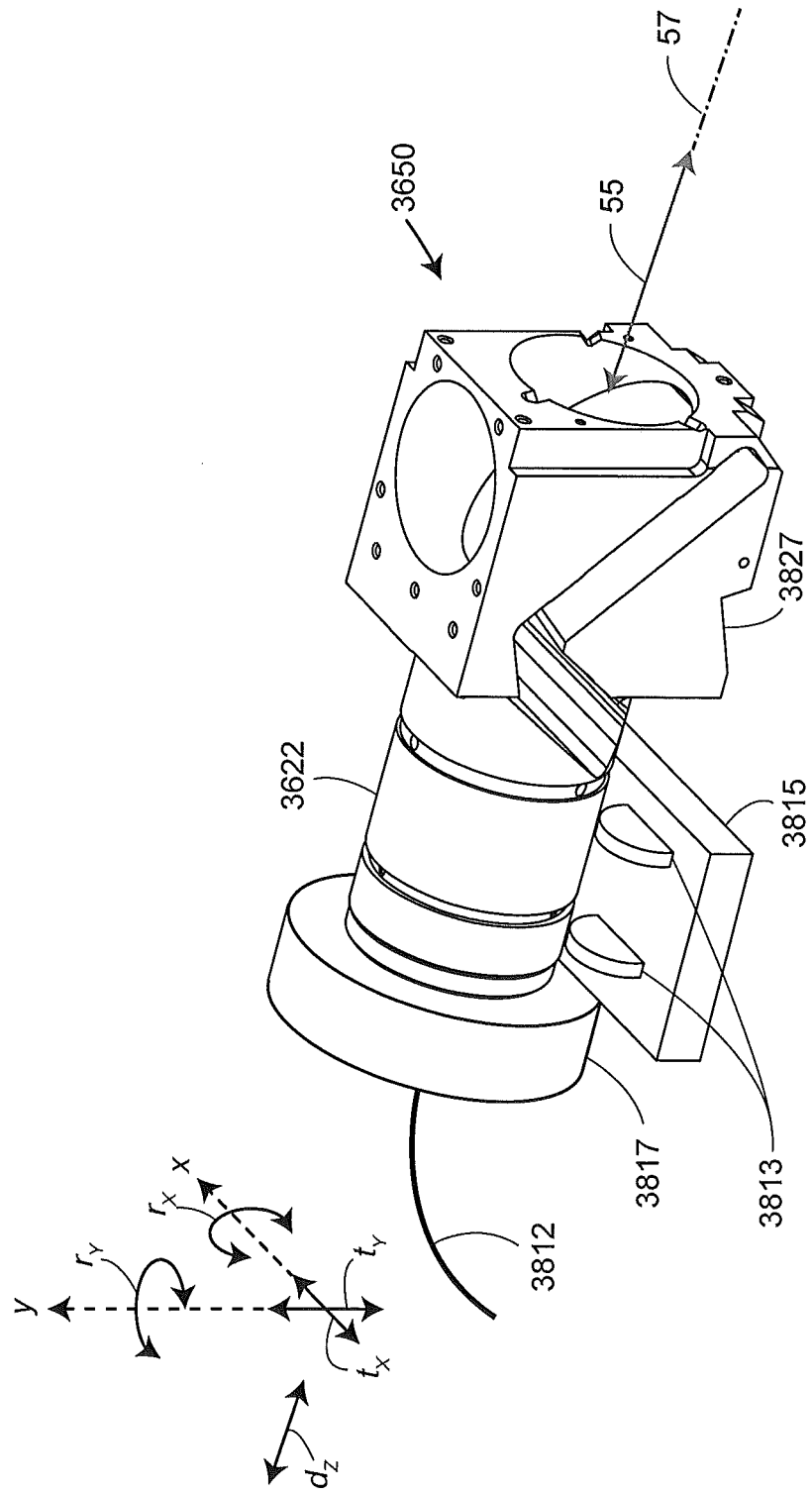
FIG. 22 is a perspective view of an optics bench mounted on an alignment fixture in accordance with an embodiment of the present invention.

An alignment fixture 3810 is used to align the optical bench assembly 3650 that will later be inserted into a zenith shaft 3630. In an embodiment, the alignment fixture 3810 includes four roller bearings 3813 embedded into a block 3815. Two of the roller bearings 3813 are visible in FIG. 22, but all four roller bearings are used to support the mating tube 3622. The alignment fixture allows the mating tube to be smoothly rotated while maintaining a constant position for the central axis of symmetry 55 of the mating tube. In addition, because the roller bearings 3813 freely rotate, the surface of the mating tube 3622 is not scored during rotation. In another embodiment, the alignment fixture 3810 includes four steel spheres rather than four roller bearings. In another embodiment, the alignment fixture 3810 includes a V-block having two planar surfaces in the shape of a V. In this embodiment, the mating tube 3622 is rotated on the V-block. A variation of the V-block is a block including two convex cylindrical surfaces rather than two planar surfaces.

To keep the optical bench assembly 3650 from tipping over, a counterweight 3817 is attached to the mating tube 3622. In an embodiment, the light is launched from ferrule 3814 as shown in FIG. 21. Light is carried to the ferrule 3814 over an optical fiber 3812. The optical fiber 3812 is routed through the counterweight 3817 during the alignment procedure. Light may also be launched from light sources located inside the mating tube.

Figure 23:
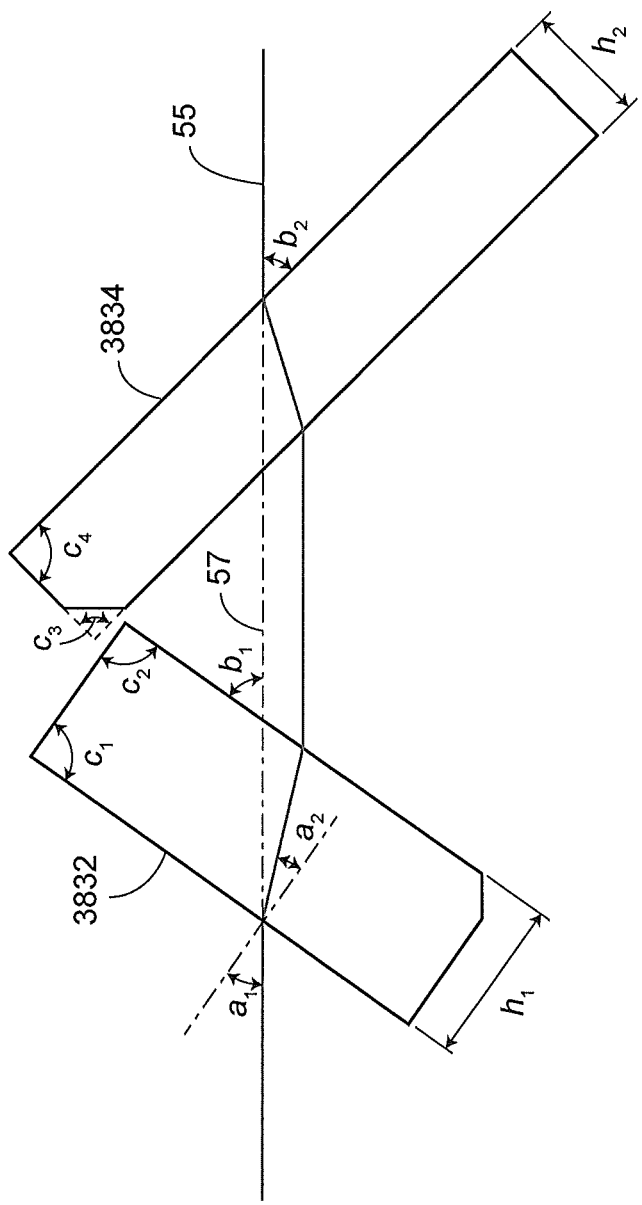
FIG. 23 is a cross sectional view of two beam splitters within the optical path of the optics bench according to an embodiment of the present invention.

As shown in FIG. 21, the optics bench 3650 includes a source of light, obtained from ferrule 3814, a collection of lenses 3822, 3824, beam splitters 3832, 3834 and a window (not shown). It is important that the light from the ferrule 3814 be centered on the lenses 3822, 3824 and also aligned with the optical axes of the two lenses. Otherwise, optical aberrations will be larger than would otherwise be possible, thereby reducing the performance of the system. The most effective way to do this is to first align the light source (ferrule 3814) to the lenses with the beam splitters 3832, 3834 removed. By removing the beam splitters and checking for runout using a procedure described below, accurate alignment of the beam of light to the lenses can be obtained. For this method to be feasible, the beam splitters must be aligned so that the light enters and exits the pair of beam splitters along the same line. In other words, a beam launched in the center of the mating tube 3622 at the end of the light source should exit the optics bench assembly 3650 at the other end of the tube as indicated by the bidirectional light ray 57 oriented along the central axis 55 in FIG. 23. The method for obtaining this condition is now described. Each of the two beam splitters 3832, 3834 has a slight wedge angle to minimize ghost beams, which are unwanted reflected beams. For example, in an embodiment shown in FIG. 23, beam splitter 3832 has a right angle $c_2$ at one corner and an angle of $c_1$=90.16 degree at an adjacent corner. This beam splitter has a wedge angle of 90.16−90 degrees=0.16 degree. Beam splitter 3834 has a wedge angle of $c_3$−$c_4$=90−89.87=0.13 degree. When light passes from air with an angle of incidence $a_1$ into glass having an index of refraction n, it emerges into the glass having an angle of refraction $a_2$ given by Snell's law: $a_2$=arcsin(sin($a_1$)/n). For example, if $a_1$=45 degrees and n=1.5, then the angle of refraction is $a_2$=arcsin(sin(45°)/1.5)=28.13°. Snell's law may be used to select thicknesses $h_1$, $h_2$ and angles $b_1$, $b_2$ in FIG. 23 to produce the desired condition. For the case of N-BK7 glass and the wedge angles mentioned above, thicknesses and angles that meet the desired conditions are $h_1$=14.3 mm, $h_2$=10.31 mm, $b_1$=55 degrees, and $b_2$=45 degrees. An important feature illustrated in FIG. 23 is that the optical elements are configured to retain the original line of the beam of light as it passes from the initial launch point to exit the optical bench assembly. Of course, the exact alignment will depend on the number and type of optical elements that are included within the optical bench assembly.

Figure 24:
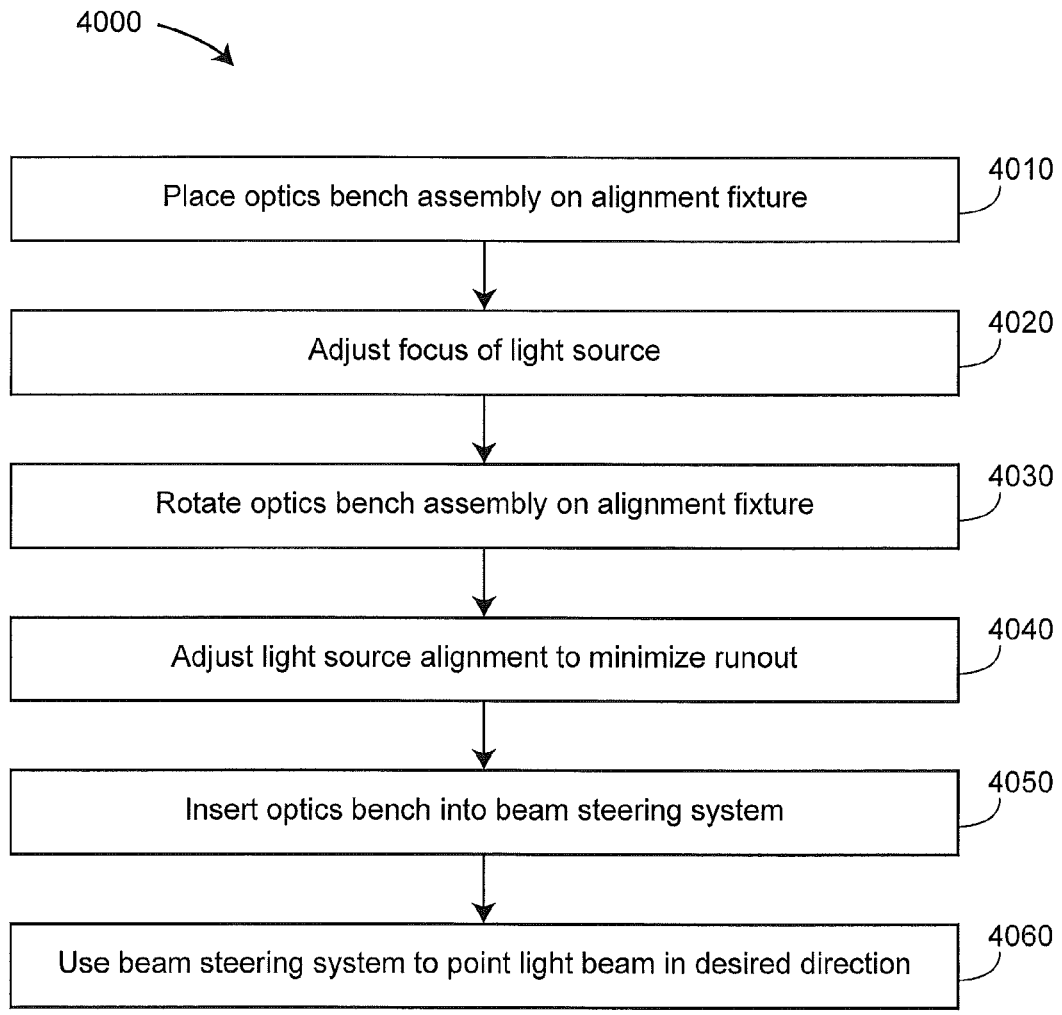
FIG. 24 is a flow chart showing steps in a method for the alignment of the optics bench according to an embodiment of the present invention.

The method for aligning the source of light is now described with reference to the steps 4000 of FIG. 24. Step 4010 is to place the optics bench assembly on an alignment fixture. Step 4020 is to adjust the focus of the light source. In one embodiment, the light may be adjusted to obtain a particular beam size at one or more distances. The focus adjustment $d_z$ shown in FIG. 22 might be obtained for example by attaching the light source (for example the fiber 3812 and ferrule 3814) into a block that is screwed into the mating tube 3622. By screwing the ferrule 3814 closer to the lens 3822, the focus of the beam of light is moved farther from the laser tracker. Step 4030 is to rotate optics bench assembly on the alignment fixture. Step 4040 is to adjust the light source to minimize the runout. The runout is defined here as the diameter of the pattern of light at some distance as the optics bench assembly is rotated. In many cases, it is advantageous to minimize the rotation at more than one position, for example, a near position, which might be one meter from the tracker and at a far position, which might be 32 meters from the tracker, for example. This adjustment is made by translations tx, ty, possibly using a slot and screw arrangement, and by rotations rx, ry, possibly using tilting mechanisms. In general, the size of a beam near to the tracker will be relatively more affected by the translation adjustments, tx, ty, while the size of a beam far from the tracker will be relatively more affected by the rotation adjustments rx, ry. The translations may be iterated between near and far positions to minimize the runout. Step 4050 is to insert the optics bench into the beam steering system, which might be beam steering system 3600, 3610. Step 4060 is to use the beam steering system to point the light beam in the desired direction.

The steps 4000 are applicable to devices that launch a light beam into space. If, in addition, a light beam is received by a device, as in the case of a laser tracker, then a position detector may be attached and aligned to the optics bench assembly 3650. A cross-sectional view of a position detector assembly 3840 is shown in FIG. 21. Position detector assembly 3840 may include a diffuser/filter 3847, an aperture (not shown in FIG. 21), and a position detector 3846. A method of aligning the position detector assembly is now described. First, the light from the optics bench is centered on a retroreflector that returns the light back along its outward direction. A convenient way to do this is to mount a cube corner retroreflector directly to the output of the optics bench assembly 3650 so that the outgoing beam of light strikes the apex of the retroreflector. In an embodiment, the cube corner is mounted to the front of the optics bench assembly 3650 using a kinematic magnetic mount. Light returning from the retroreflector strikes the beam splitter 3832 and passes through the opening in a bottom surface 3827 of the optics bench assembly. (The elements of the position detector assembly will be mounted into this opening.) An external, separately mounted position detector is placed in front of the opening in the surface 3827. The position at which the light reflected from the beam splitter 3832 strikes the external position detector is observed. The diffuser/filter 3847 and lens 3842 are put in place and adjusted using mechanical structures 3842 to center the beam at the first observed position on the external position detector. The internal position detector 3848 is placed in position and adjusted to place the light beam approximately at its center. Light entering or leaving secondary optics assembly 3740, 910 may be aligned after the alignment of the optics bench assembly 3650 has been completed.

Figure 25:
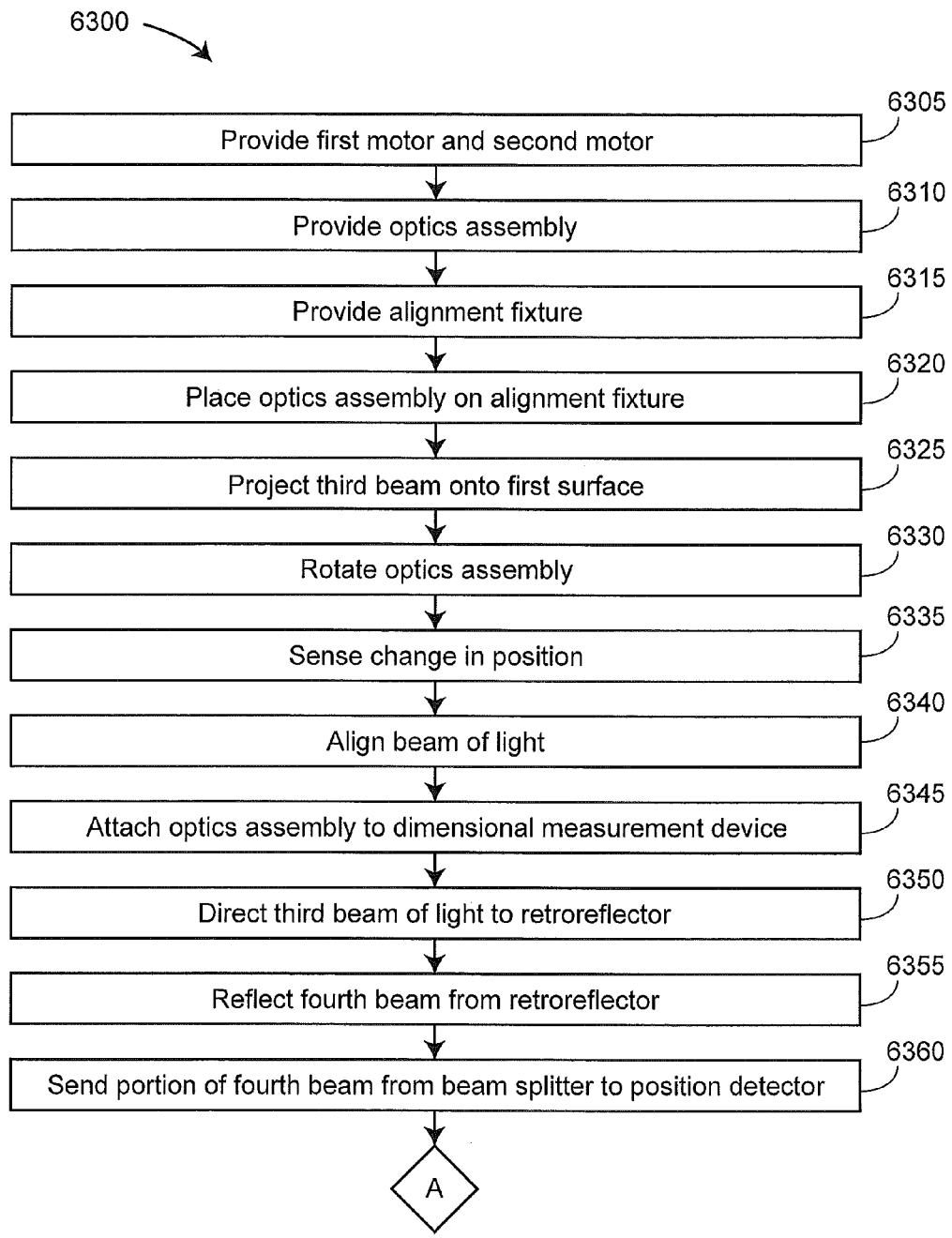
FIG. 25 is a flow chart of a method of pre-aligning an optics assembly, installing the optics assembly in a dimensional measurement device, and using the device to measure a remote retroreflector target, according to an embodiment of the present invention.

FIG. 25 is a flow chart of a method 6300 of pre-aligning an optics assembly, installing the optics assembly in a dimensional measurement device, and using the dimensional measurement device to measure a remote retroreflector target.

The step 6305 is to provide a first motor and a second motor that together align a fifth axis to a first direction, the first direction determined by a first angle of rotation about a first axis and a second angle of rotation about a second axis, the second axis substantially perpendicular to the first axis, the first axis, the second axis, and the fifth axis intersecting substantially at a gimbal point, the first angle of rotation produced by the first motor and the second angle of rotation produced by the second motor.

The step 6310 is to provide an optics assembly including a housing, a light element, a lens, a first beam splitter, and a position detector, wherein the light element, the lens, the first beam splitter, and the position detector are fixedly attached to the housing, the housing having a substantially cylindrical shape over at least a first region of an outer surface of the housing, the cylindrical shape having a sixth axis passing through a center line of the cylindrical shape, distances from the sixth axis to points on the first region having a substantially constant value, the light element being either a source of light or an optical fiber component attached to the source of light, the light element configured to emit a first light, a third beam of light being a portion of the first light, the third beam of light having a first path in relation to the optics assembly, the optics assembly configured to enable adjustment of the first path.

The step 6315 is to provide an alignment fixture, the alignment fixture configured to support the optics assembly on the first region and to constrain rotation of the optics assembly about the sixth axis.

The step 6320 is to place the optics assembly on the alignment fixture in such a manner that the alignment fixture makes contact with the optics assembly at points of contact on the first region.

The step 6325 is to project the third beam of light onto a first surface, the first surface at a first distance from the optics assembly.

The step 6330 is to rotate the optics assembly about the sixth axis on the alignment fixture.

The step 6335 is to sense a change in a position of the third beam of light on the first surface in response to the rotation of the optics assembly about the sixth axis.

The step 6440 is to adjust the first path to align the third beam of light to the sixth axis, the adjustment based at least in part on the observed change in the position of the third beam of light on the first surface.

The step 6445 is to attach the optics assembly to the dimensional measurement device, wherein the attaching aligns the third beam of light with the fifth axis.

The step 6450 is to direct the third beam of light to a remote retroreflector target.

The step 6455 is to reflect a portion of the third beam of light from the retroreflector target as a fourth beam of light.

The step 6460 is to send a third portion of the fourth beam of light from the beam splitter to the position detector. The method 6300 concludes at marker A.

Figure 26:
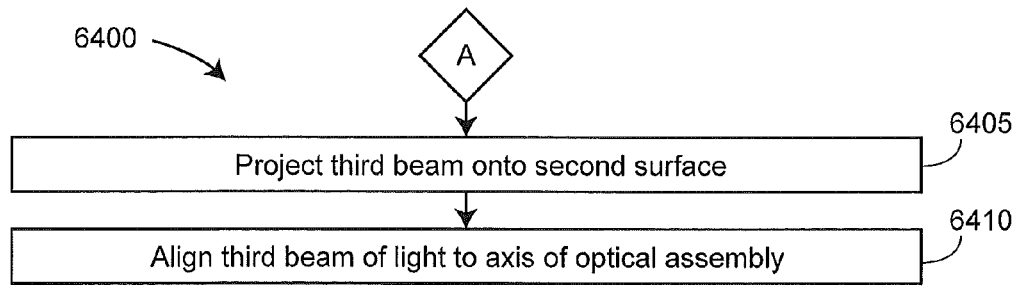
FIG. 26 is a flow chart of a method according to an embodiment of the present invention that begins at marker A of FIG. 25.

FIG. 26 is a flow chart of a method 6400 that begins at marker A of FIG. 25. The step 6405 is to project the third beam of light onto a second surface, the second surface at a second distance from the optics assembly. The step 6410 is to adjust the first path to align the third beam of light to the sixth axis, the adjustment based at least in part on the observed change in the position of the third beam of light on the second surface.

Figure 27:
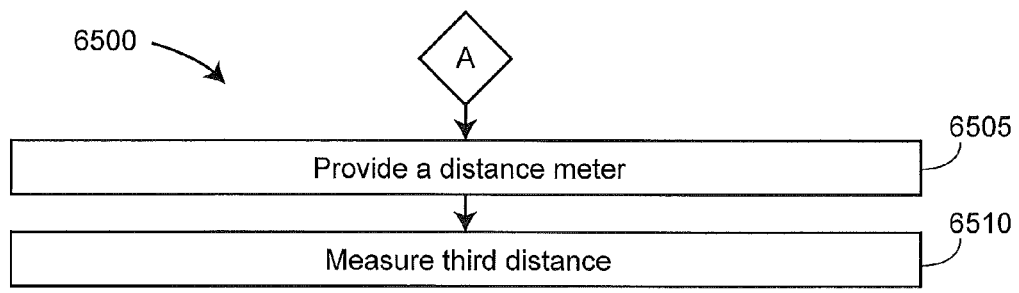
FIG. 27 is a flow chart of a method according to an embodiment of the present invention that begins at marker A of FIG. 25.

FIG. 27 is a flow chart of a method 6500 that begins at marker A of FIG. 25. The step 6505 is to provide a distance meter that measures a third distance from the gimbal point to the retroreflector target based at least in part on a first portion of the second beam received by a first optical detector. The step 6510 is to measure the third distance.

Figure 28:
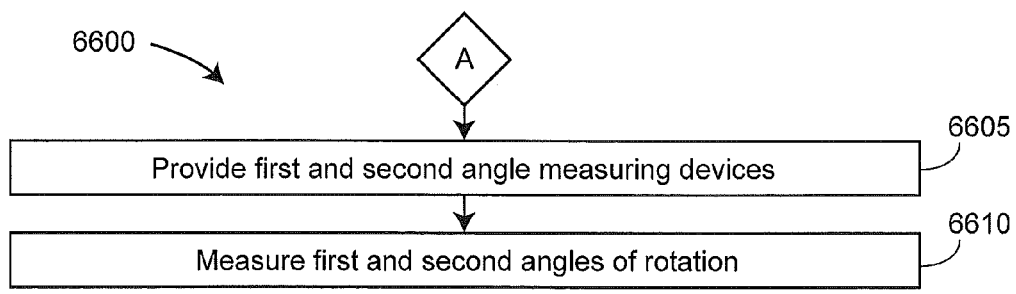
FIG. 28 is a flow chart of a method according to an embodiment of the present invention that begins at marker A of FIG. 25.

FIG. 28 is a flow chart of a method 6600 that begins at marker A of FIG. 25. The step 6605 is to provide a first angle measuring device that measures the first angle of rotation and a second angle measuring device that measures the second angle of rotation. The step 6610 is to measure the first angle of rotation and the second angle of rotation.

Figure 29:
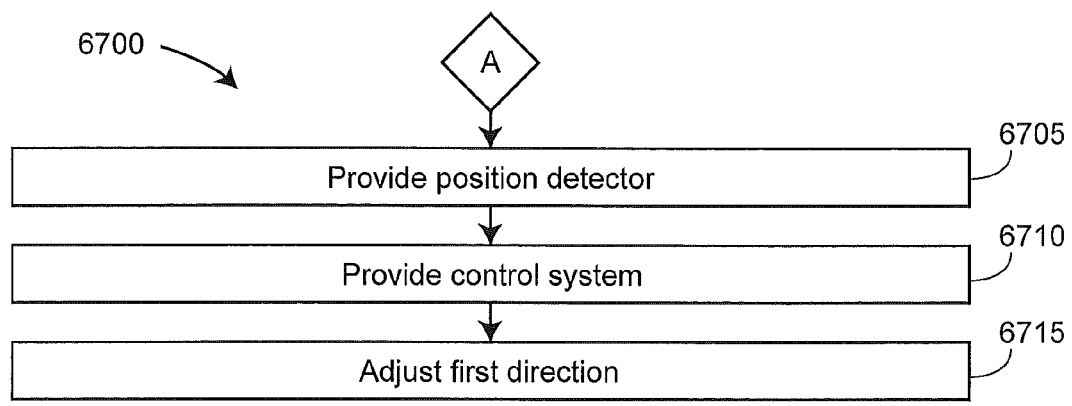
FIG. 29 is a flow chart of a method according to an embodiment of the present invention that begins at marker A of FIG. 25.

FIG. 29 is a flow chart of a method 6700 that begins at marker A of FIG. 25. The step 6705 is to provide the position detector configured to produce a first signal in response to a position of the third portion on the position detector. The step 6710 is to provide a control system, the control system configured to sends a second signal to the first motor and a third signal to the second motor, the second signal and the third signal based at least in part on the first signal, the control system configured to adjust the first direction to the position in space of the retroreflector target. The step 6715 is to adjust the first direction.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dimensional measurement device that sends a first beam of light to a remote retroreflector target, the retroreflector target having a position in space, the retroreflector target returning a portion of the first beam as a second beam, the measurement device comprising:

a first motor and a second motor that together direct the first beam of light to a first direction, the first direction determined by a first angle of rotation about a first axis and a second angle of rotation about a second axis, the second axis substantially perpendicular to the first axis, the first axis and the second axis intersecting substantially at a gimbal point, the first angle of rotation produced by the first motor and the second angle of rotation produced by the second motor;

an optics assembly including a housing, a light element, a lens, a first beam splitter, and a position detector, wherein the light element, the lens, the first beam splitter, and the position detector are fixedly attached to the housing, the housing having a substantially cylindrical shape over at least a first region of an outer surface of the housing, the cylindrical shape having a third axis passing through a center line of the cylindrical shape, distances from the third axis to points on the first region being a substantially constant value, the light element being either a source of light or an optical fiber component attached to the source of light, the light element configured to emit a first light, the first beam being a portion of the first light emitted from the optics assembly, the optics assembly configured to send the first beam of light along a fourth axis, the third axis and the fourth axis substantially coincident and substantially in line with the gimbal point and substantially in a plane containing the first axis and perpendicular to the second axis, the first beam splitter configured to send a second portion of the second beam of light to the position detector, the position detector configured to produce a first signal in response to a position of the second portion on the position detector; and a control system that sends a second signal to the first motor and a third signal to the second motor, the second signal and the third signal based at least in part on the first signal, the control system configured to adjust the first direction to the position in space of the retroreflector target.

2. The dimensional measurement device of claim 1, wherein the optical assembly is configured to direct the first beam along the third axis.

3. The dimensional measurement device of claim 1, wherein the first region is metallic.

4. The dimensional measurement device of claim 1, wherein the optical fiber component is a ferrule.

5. The dimensional measurement device of claim 1, wherein the source of light is a diode laser.

6. The dimensional measurement device of claim 1, wherein the lens is configured to collimate the first light.

7. The dimensional measurement device of claim 1, wherein the optics assembly includes a second beam splitter, the first beam splitter and the second beam splitter being a beam-splitter set.

8. The dimensional measurement device of claim 7, wherein the optics assembly is configured to align the first light entering the beam-splitter set and the first light exiting the beam-splitter set along the fourth axis.

9. The dimensional measurement device of claim 1, further including a distance meter that measures a first distance from the gimbal point to the retroreflector target based at least in part on a first portion of the second beam received by a first optical detector.

10. The dimensional measurement device of claim 1, further including a first angle measuring device that measures the first angle of rotation and a second angle measuring device that measures the second angle of rotation.

11. The dimensional measurement device of claim 8, further including a first angle measuring device that measures the first angle of rotation and a second angle measuring device that measures the second angle of rotation.

12. A method of pre-aligning an optics assembly, installing the optics assembly in a dimensional measurement device, and using the dimensional measurement device to measure a remote retroreflector target, the method comprising steps of:

providing a first motor and a second motor that together align a fifth axis to a first direction, the first direction determined by a first angle of rotation about a first axis and a second angle of rotation about a second axis, the second axis substantially perpendicular to the first axis, the first axis, the second axis, and the fifth axis intersecting substantially at a gimbal point, the first angle of rotation produced by the first motor and the second angle of rotation produced by the second motor;

providing an optics assembly including a housing, a light element, a lens, a first beam splitter, and a position detector, wherein the light element, the lens, the first beam splitter, and the position detector are fixedly attached to the housing, the housing having a substantially cylindrical shape over at least a first region of an outer surface of the housing, the cylindrical shape having a sixth axis passing through a center line of the cylindrical shape, distances from the sixth axis to points on the first region having a substantially constant value, the light element being either a source of light or an optical fiber component attached to the source of light, the light element configured to emit a first light, a third beam of light being a portion of the first light, the third beam of light having a first path in relation to the optics assembly, the optics assembly configured to enable adjustment of the first path;

providing an alignment fixture, the alignment fixture configured to support the optics assembly on the first region and to constrain rotation of the optics assembly about the sixth axis;

placing the optics assembly on the alignment fixture in such a manner that the alignment fixture makes contact with the optics assembly at points of contact on the first region;

projecting the third beam of light onto a first surface, the first surface at a first distance from the optics assembly;

rotating the optics assembly about the sixth axis on the alignment fixture;

sensing a change in a position of the third beam of light on the first surface in response to the rotation of the optics assembly about the sixth axis;

adjusting the first path to align the third beam of light to the sixth axis, the adjustment based at least in part on the observed change in the position of the third beam of light on the first surface;

attaching the optics assembly to the dimensional measurement device, wherein the attaching aligns the third beam of light with the fifth axis;

directing the third beam of light to a remote retroreflector target;

reflecting a portion of the third beam of light from the retroreflector target as a fourth beam of light; and sending a third portion of the fourth beam of light from the beam splitter to the position detector.

13. The method of claim 12, wherein the step of sensing a change in a position of the third beam of light on the first surface in response to the rotation of the optics assembly about the sixth axis further includes measuring a first runout diameter at the first surface.

14. The method of claim 13, further including steps of:
projecting the third beam of light onto a second surface, the second surface at a second distance from the optics assembly; and
adjusting the first path to align the third beam of light to the sixth axis, the adjustment based at least in part on the observed change in the position of the third beam of light on the second surface.

15. The method of claim 14, wherein the step of adjusting the first path to align the third beam of light to the sixth axis further includes measuring a second runout diameter at the second surface.

16. The method of claim 12, wherein, in the step of sensing a change in a position of the third beam of light on the first surface, the first surface is a surface of an optical detector.

17. The method of claim 12, wherein, in the step of providing an optics assembly, the first region is metallic.

18. The method of claim 12, wherein, in the step of providing an optics assembly, the optical fiber component is a ferrule.

19. The method of claim 12, wherein, in the step of providing an optics assembly, the source of light is a diode laser.

20. The method of claim 12, wherein the step of providing an optics assembly further includes providing the lens configured to collimate the first light.

21. The method of claim 12, further comprising:
providing a distance meter that measures a third distance from the gimbal point to the retroreflector target based at least in part on a first portion of the second beam received by a first optical detector; and
measuring the third distance.

22. The method of claim 12, further comprising:
providing a first angle measuring device that measures the first angle of rotation and a second angle measuring device that measures the second angle of rotation; and
measuring the first angle of rotation and the second angle of rotation.

23. The method of claim 21, further comprising providing a first angle measuring device that measures the first angle of rotation and a second angle measuring device that measures the second angle of rotation.

24. The method of claim 12, further including steps of:
providing the position detector configured to produce a first signal in response to a position of the third portion on the position detector;
providing a control system, the control system configured to sends a second signal to the first motor and a third signal to the second motor, the second signal and the third signal based at least in part on the first signal, the control system configured to adjust the first direction to the position in space of the retroreflector target; and
adjusting the first direction.

* * * * *